US012658994B2

(12) United States Patent　　(10) Patent No.:　US 12,658,994 B2

Lin　　(45) Date of Patent:　Jun. 16, 2026

(54) METHOD AND APPARATUS FOR CHANNEL STATE INFORMATION REFERENCE RESOURCE MEASUREMENT AND REPORTING IN A WIRELESS COMMUNICATION SYSTEM

(71) Applicant: ASUS Technology Licensing Inc., Taipei City (TW)

(72) Inventor: Ko-Chiang Lin, Taipei City (TW)

(73) Assignee: ASUS Technology Licensing Inc., Taipei City (TW)

( * ) Notice: Subject to any disclaimer, the term of this patent is extended or adjusted under 35 U.S.C. 154(b) by 321 days.

(21) Appl. No.: 18/227,814

(22) Filed: Jul. 28, 2023

(65) Prior Publication Data

US 2024/0048201 A1　　Feb. 8, 2024

Related U.S. Application Data

(60) Provisional application No. 63/392,995, filed on Jul. 28, 2022.

(51) Int. Cl.
H04B 7/06　　(2006.01)
H04W 24/10　　(2009.01)
H04W 72/0446　　(2023.01)

(52) U.S. Cl.
CPC .......... H04B 7/0626 (2013.01); H04W 24/10 (2013.01); H04W 72/0446 (2013.01)

(58) Field of Classification Search
CPC . H04B 7/0626; H04W 24/10; H04W 72/0446
See application file for complete search history.

(56) References Cited

U.S. PATENT DOCUMENTS

| | | | | |
|---|---|---|---|---|
| 2014/0086174 | A1* | 3/2014 | Nam | H04L 1/0031 |
| | | | | 370/329 |
| 2019/0165846 | A1* | 5/2019 | Kim | H04L 1/0026 |
| 2019/0215712 | A1 | 7/2019 | Babaei et al. | |
| 2020/0260442 | A1* | 8/2020 | Yi | H04L 5/14 |
| 2020/0287676 | A1* | 9/2020 | Jo | H04B 7/0626 |
| 2022/0302978 | A1* | 9/2022 | Guo | H04B 7/0621 |
| 2023/0344583 | A1* | 10/2023 | Yi | H04L 5/0053 |

FOREIGN PATENT DOCUMENTS

| | | |
|---|---|---|
| KR | 1020200143510 | 12/2020 |
| WO | 2022024042 | 2/2022 |

OTHER PUBLICATIONS

European Search Report in corresponding EP Application No. 23188302.6-1213, dated Dec. 21, 2023.
3rd Generation Partnership Project: Technical Specification Group Radio Access Network; NR: "Physical Layer Procedures for Control" 3GPP, TS38.213 v15.15.0; 3GPP Server Release Date Jun. 23, 2022, 111 pages.
Corresponding Korean Intellectual Property Office Application No. 10-2023-0098830, Office Action dated Oct. 17, 2025, 13 pages.

* cited by examiner

*Primary Examiner* — Deepa Belur
(74) *Attorney, Agent, or Firm* — Cooper Legal Group LLC

(57)　　ABSTRACT
A method and device for channel state information reference resource. In one embodiment, a User Equipment (UE) is configured to report Channel State Information (CSI) to a base station. Furthermore, the UE measures reference signal on a symbol in a slot for reporting the CSI. In addition, the slot is determined based on transmission direction of frequency resource to be measured for the CSI.

20 Claims, 19 Drawing Sheets

| Format | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| 4 | D | D | D | D | D | D | D | D | D | D | D | D | F | F |
| 5 | D | D | D | D | D | D | D | D | D | D | D | F | F | F |
| 6 | D | D | D | D | D | D | D | D | D | D | F | F | F | F |
| 7 | D | D | D | D | D | D | D | D | D | F | F | F | F | F |
| 8 | F | F | F | F | F | F | F | F | F | F | F | F | F | U |
| 9 | F | F | F | F | F | F | F | F | F | F | F | F | U | U |
| 10 | F | U | U | U | U | U | U | U | U | U | U | U | U | U |
| 11 | F | F | U | U | U | U | U | U | U | U | U | U | U | U |
| 12 | F | F | F | U | U | U | U | U | U | U | U | U | U | U |
| 13 | F | F | F | F | U | U | U | U | U | U | U | U | U | U |
| 14 | F | F | F | F | F | U | U | U | U | U | U | U | U | U |
| 15 | F | F | F | F | F | F | U | U | U | U | U | U | U | U |
| 16 | D | F | F | F | F | F | F | F | F | F | F | F | F | F |
| 17 | D | D | F | F | F | F | F | F | F | F | F | F | F | F |
| 18 | D | D | D | F | F | F | F | F | F | F | F | F | F | F |
| 19 | D | F | F | F | F | F | F | F | F | F | F | F | F | U |
| 20 | D | D | F | F | F | F | F | F | F | F | F | F | F | U |
| 21 | D | D | D | F | F | F | F | F | F | F | F | F | F | U |
| 22 | D | F | F | F | F | F | F | F | F | F | F | F | U | U |
| 23 | D | D | F | F | F | F | F | F | F | F | F | F | U | U |
| 24 | D | D | D | F | F | F | F | F | F | F | F | F | U | U |
| 25 | D | F | F | F | F | F | F | F | F | F | F | U | U | U |
| 26 | D | D | F | F | F | F | F | F | F | F | F | U | U | U |
| 27 | D | D | D | F | F | F | F | F | F | F | F | U | U | U |
| 28 | D | D | D | D | D | D | D | D | D | D | D | D | F | U |
| 29 | D | D | D | D | D | D | D | D | D | D | D | F | F | U |
| 30 | D | D | D | D | D | D | D | D | D | D | F | F | F | U |
| 31 | D | D | D | D | D | D | D | D | D | D | D | F | U | U |
| 32 | D | D | D | D | D | D | D | D | D | D | F | F | U | U |
| 33 | D | D | D | D | D | D | D | D | D | F | F | F | U | U |
| 34 | D | F | U | U | U | U | U | U | U | U | U | U | U | U |
| 35 | D | D | F | U | U | U | U | U | U | U | U | U | U | U |
| 36 | D | D | D | F | U | U | U | U | U | U | U | U | U | U |
| 37 | D | F | F | U | U | U | U | U | U | U | U | U | U | U |
| 38 | D | D | F | F | U | U | U | U | U | U | U | U | U | U |
| 39 | D | D | D | F | F | U | U | U | U | U | U | U | U | U |
| 40 | D | F | F | F | U | U | U | U | U | U | U | U | U | U |
| 41 | D | D | F | F | F | U | U | U | U | U | U | U | U | U |
| 42 | D | D | D | F | F | F | U | U | U | U | U | U | U | U |
| 43 | D | D | D | D | D | D | D | D | D | F | F | F | F | U |
| 44 | D | D | D | D | D | D | F | F | F | F | F | F | U | U |
| 45 | D | D | D | D | D | D | F | F | U | U | U | U | U | U |
| 46 | D | D | D | D | D | F | U | D | D | D | D | D | F | U |
| 47 | D | D | F | U | U | U | U | D | D | F | U | U | U | U |
| 48 | D | F | U | U | U | U | U | D | F | U | U | U | U | U |
| 49 | D | D | D | D | F | F | U | D | D | D | D | F | F | U |
| 50 | D | D | F | F | U | U | U | D | D | F | F | U | U | U |
| 51 | D | F | F | U | U | U | U | D | F | F | U | U | U | U |
| 52 | D | F | F | F | F | F | U | D | F | F | F | F | F | U |
| 53 | D | D | F | F | F | F | U | D | D | F | F | F | F | U |
| 54 | F | F | F | F | F | F | F | D | D | D | D | D | D | D |
| 55 | D | D | F | F | F | U | U | U | D | D | D | D | D | D |
| 56 – 254 | Reserved | | | | | | | | | | | | | |
| 255 | UE determines the slot format for the slot based on tdd-UL-DL-ConfigurationCommon, or tdd-UL-DL-ConfigurationDedicated and, if any, on detected DCI formats | | | | | | | | | | | | | |

FIG. 6 (PRIOR ART)

| Bandwidth part (PRBs) | Subband size (PRBs) |
|-----------------------|---------------------|
| 24 – 72               | 4, 8                |
| 73 – 144              | 8, 16               |
| 145 – 275             | 16, 32              |

FIG. 7 (PRIOR ART)

| Sub-band differential CQI value | Offset level |
|---------------------------------|--------------|
| 0                               | 0            |
| 1                               | 1            |
| 2                               | $\geq 2$     |
| 3                               | $\leq -1$    |

FIG. 8 (PRIOR ART)

| CQI index | modulation | code rate x 1024 | efficiency |
|---|---|---|---|
| 0 | out of range | | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

FIG. 9 (PRIOR ART)

| CQI index | modulation | code rate x 1024 | efficiency |
|-----------|------------|------------------|------------|
| 0 | out of range | | |
| 1 | QPSK | 78 | 0.1523 |
| 2 | QPSK | 193 | 0.3770 |
| 3 | QPSK | 449 | 0.8770 |
| 4 | 16QAM | 378 | 1.4766 |
| 5 | 16QAM | 490 | 1.9141 |
| 6 | 16QAM | 616 | 2.4063 |
| 7 | 64QAM | 466 | 2.7305 |
| 8 | 64QAM | 567 | 3.3223 |
| 9 | 64QAM | 666 | 3.9023 |
| 10 | 64QAM | 772 | 4.5234 |
| 11 | 64QAM | 873 | 5.1152 |
| 12 | 256QAM | 711 | 5.5547 |
| 13 | 256QAM | 797 | 6.2266 |
| 14 | 256QAM | 885 | 6.9141 |
| 15 | 256QAM | 948 | 7.4063 |

FIG. 10 (PRIOR ART)

| CQI index | modulation | code rate x 1024 | efficiency |
|-----------|------------|------------------|------------|
| 0 | out of range | | |
| 1 | QPSK | 30 | 0.0586 |
| 2 | QPSK | 50 | 0.0977 |
| 3 | QPSK | 78 | 0.1523 |
| 4 | QPSK | 120 | 0.2344 |
| 5 | QPSK | 193 | 0.3770 |
| 6 | QPSK | 308 | 0.6016 |
| 7 | QPSK | 449 | 0.8770 |
| 8 | QPSK | 602 | 1.1758 |
| 9 | 16QAM | 378 | 1.4766 |
| 10 | 16QAM | 490 | 1.9141 |
| 11 | 16QAM | 616 | 2.4063 |
| 12 | 64QAM | 466 | 2.7305 |
| 13 | 64QAM | 567 | 3.3223 |
| 14 | 64QAM | 666 | 3.9023 |
| 15 | 64QAM | 772 | 4.5234 |

FIG. 11 (PRIOR ART)

METHOD AND APPARATUS FOR CHANNEL STATE INFORMATION REFERENCE RESOURCE MEASUREMENT AND REPORTING IN A WIRELESS COMMUNICATION SYSTEM

CROSS-REFERENCE TO RELATED APPLICATIONS

The present Application claims the benefit of U.S. Provisional Patent Application Ser. No. 63/392,995 filed on Jul. 28, 2022, the entire disclosure of which is incorporated herein in its entirety by reference.

FIELD

This disclosure generally relates to wireless communication networks, and more particularly, to a method and apparatus for channel state information reference resource in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and device for channel state information reference resource. In one embodiment, a User Equipment (UE) is configured to report Channel State Information (CSI) to a base station. Furthermore, the UE measures reference signal on a symbol in a slot for reporting the CSI. In addition, the slot is determined based on transmission direction of frequency resource to be measured for the CSI.

BRIEF DESCRIPTION OF THE DRAWINGS

FIG. 6 is a reproduction of Table 11.1.1-1 of 3GPP TS 38.213 V16.6.0.

FIG. 7 is a reproduction of Table 5.2.1.4-2 of 3GPP TS 38.213 V16.10.0.

FIG. 8 is a reproduction of Table 5.2.2.1-1 of 3GPP TS 38.213 V16.10.0.

FIG. 9 is a reproduction of Table 5.2.2.1-2 of 3GPP TS 38.213 V16.10.0.

FIG. 10 is a reproduction of Table 5.2.2.1-3 of 3GPP TS 38.213 V16.10.0.

FIG. 11 is a reproduction of Table 5.2.2.1-4 of 3GPP TS 38.213 V16.10.0.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio), or some other modulation techniques.

In particular, the exemplary wireless communication systems and devices described below may be designed to support one or more standards such as the standard offered by a consortium named "3rd Generation Partnership Project" referred to herein as 3GPP, including: TS 38.211 V15.7.0, "NR; Physical channels and modulation (Release 15)"; TS 38.213 V16.6.0, "NR; Physical layer procedures for control (Release 16)"; TS 38.321 V16.7.0, "NR; Media Access Control (MAC) protocol specification (Release 16)"; TS 38.213 V16.10.0, "NR; Physical layer procedures for data (Release 16)"; and RP-212707, "Draft SID on Evolution of NR Duplex Operation", Samsung (Moderator). The standards and documents listed above are hereby expressly incorporated by reference in their entirety.

Figure 1:
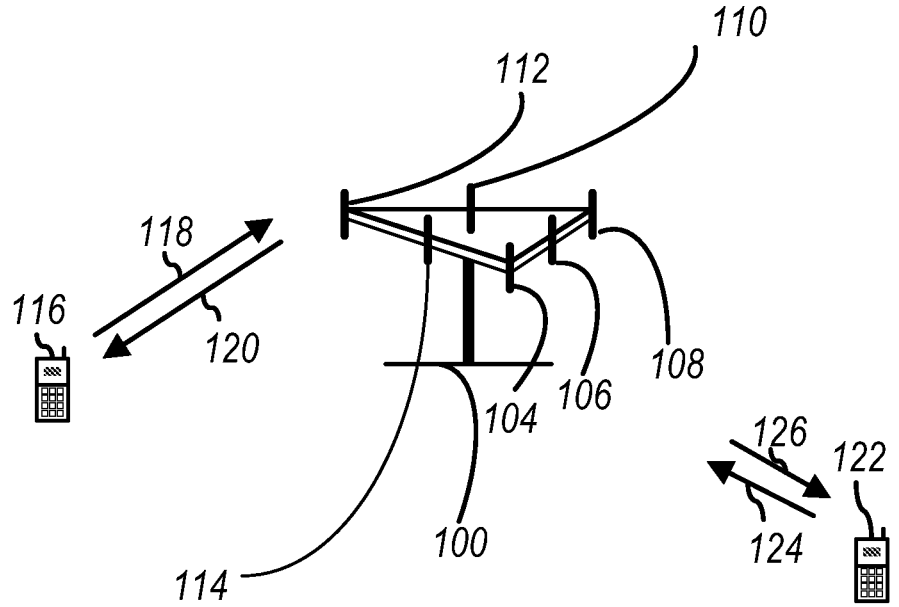
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), a network node, a network, or some other terminology. An access terminal (AT) may also be called user equipment (UE), a wireless communication device, terminal, access terminal or some other terminology.

Figure 2:
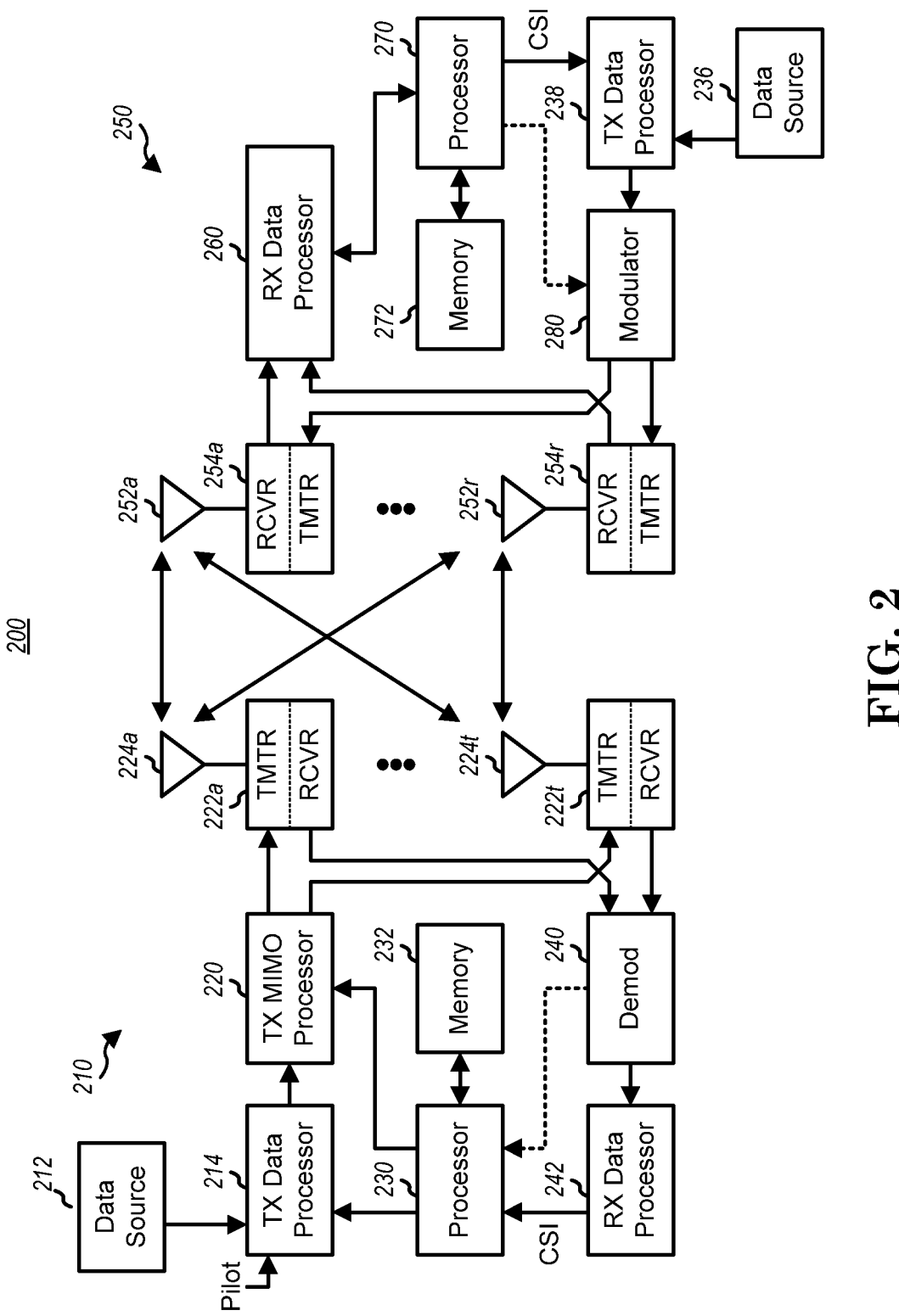
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
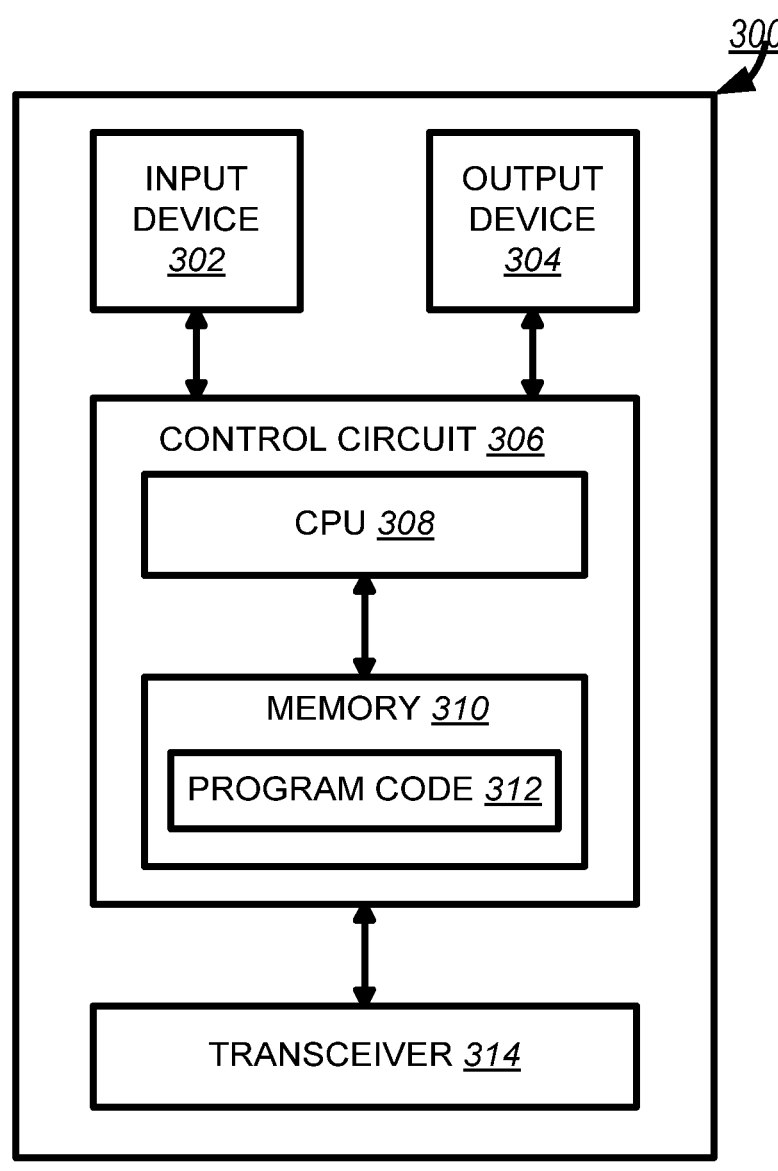
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
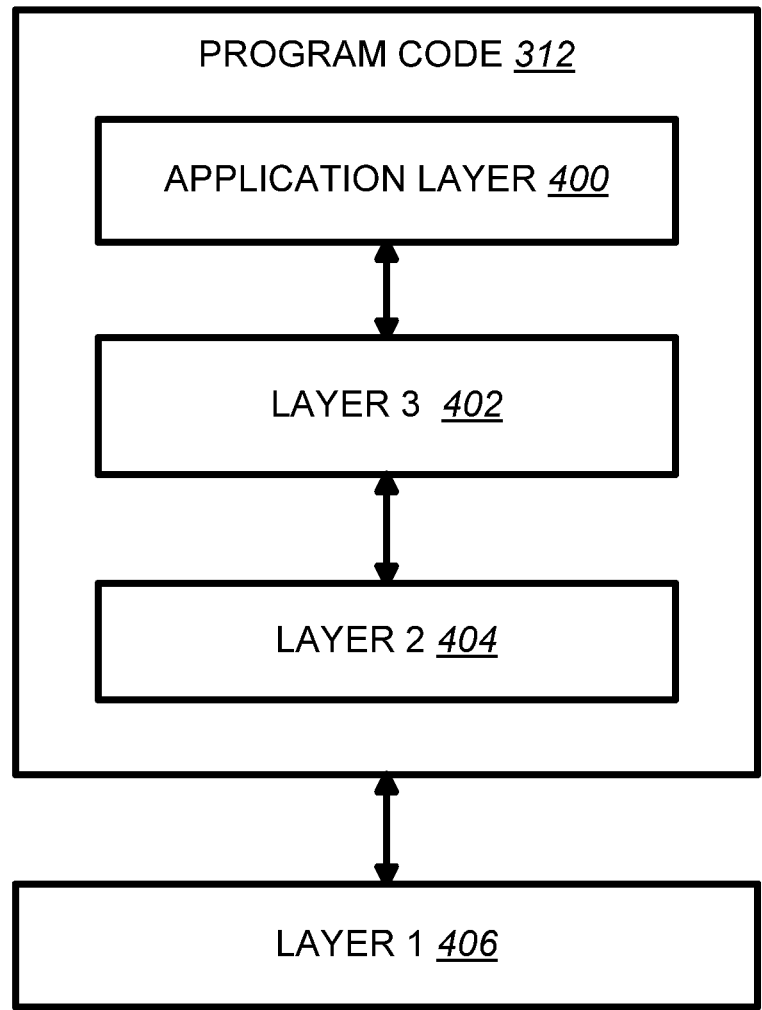
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

Frame structure used in New RAT (NR) for 5G, to accommodate various type of requirement (as discussed in 3GPP TS 38.211) for time and frequency resource, e.g. from ultra-low latency (~0.5 ms) to delay-tolerant traffic for Machine Type Communication (MTC), from high peak rate for eMBB to very low data rate for MTC. An important focus of this study is low latency aspect, e.g. short Transmission Time Interval (TTI), while other aspect of mixing/adapting different TTIs can also be considered in the study. In addition to diverse services and requirements, forward compatibility is an important consideration in initial NR frame structure design as not all features of NR would be included in the beginning phase/release.

More details of NR frame structure, channel and numerology design is provided in 3GPP TS 38.211 as follows:

4.3 Frame Structure

4.3.1 Frames and Subframes

Downlink and uplink transmissions are organized into frames with $T_f=(\Delta f_{max}N_f/100)\cdot T_c=10$ ms duration, each consisting of ten subframes of $T_{sf}=(\Delta f_{max}N_f/100)\cdot T_c=1$ ms duration. The number of consecutive OFDM symbols per subframe is $$N_{symb}^{subframe,\mu} = N_{symb}^{slot}N_{slot}^{subframe,\mu}.$$

Each frame is divided into two equally-sized half-frames of five subframes each with half-frame 0 consisting of subframes 0-4 and half-frame 1 consisting of subframes 5-9. There is one set of frames in the uplink and one set of frames in the downlink on a carrier. Uplink frame number i for transmission from the UE shall start $T_{TA}=(N_{TA}+N_{TA,offset})T_c$ before the start of the corresponding downlink frame at the UE where $N_{TA,offset}$ is given by [5, TS 38.213].

Figure 5:
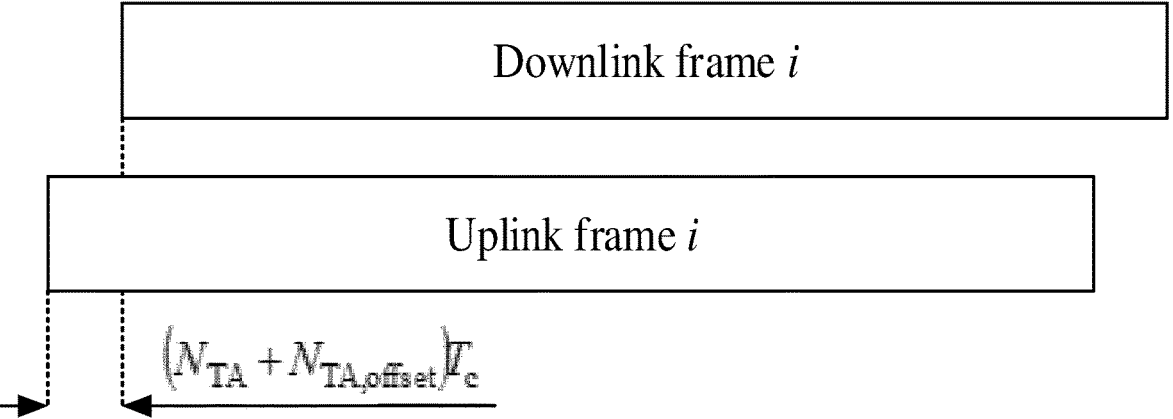
FIG. 5 is a reproduction of FIG. 4.3.1-1 of 3GPP TS 38.211 V15.7.0.

[FIG. 4.3.1-1 of 3GPP TS 38.211 V15.7.0, Entitled "Uplink-Downlink Timing Relation", is Reproduced as FIG. 5]

4.3.2 Slots

For subcarrier spacing configuration $\mu$, slots are numbered $$n_s^\mu \in \left\{0, \dots, N_{slot}^{subframe,\mu} - 1\right\}$$

in increasing order within a subframe and $$n_{s,f}^\mu \in \left\{0, \dots, N_{slot}^{frame,\mu} - 1\right\}$$

in increasing order within a frame. There are $$N_{symb}^{slot}$$

consecutive OFDM symbols in a slot where $$N_{symb}^{slot}$$

depends on the cyclic prefix as given by Tables 4.3.2-1 and 4.3.2-2. The start of slot $$n_s^\mu$$

in a subframe is aligned in time with the start of OFDM symbol $$n_s^\mu N_{symb}^{slot}$$

in the same subframe. OFDM symbols in a slot can be classified as 'downlink', 'flexible', or 'uplink'. Signaling of slot formats is described in subclause 11.1 of [5, TS 38.213].

In a slot in a downlink frame, the UE shall assume that downlink transmissions only occur in 'downlink' or 'flexible' symbols.

In a slot in an uplink frame, the UE shall only transmit in 'uplink' or 'flexible' symbols.

4.4.3 Resource Elements

Each element in the resource grid for antenna port p and subcarrier spacing configuration $\mu$ is called a resource element and is uniquely identified by $(k,l)_{p,\mu}$ where k is the index in the frequency domain and l refers to the symbol position in the time domain relative to some reference point. Resource element $(k,l)_{p,\mu}$ corresponds to a physical resource and the complex value $$a_{k,l}^{(p,\mu)}.$$

When there is no risk for confusion, or no particular antenna port or subcarrier spacing is specified, the indices p and $\mu$ may be dropped, resulting in $$a_{k,l}^{(p)}$$

or $a_{k,l}$.

4.4.4 Resource Blocks

4.4.4.1 General

A resource block is defined as $$N_{SC}^{RB} = 12$$

consecutive subcarriers in the frequency domain.

4.4.4.3 Common Resource Blocks

Common resource blocks are numbered from 0 and upwards in the frequency domain for subcarrier spacing configuration $\mu$. The center of subcarrier 0 of common resource block 0 for subcarrier spacing configuration $\mu$ coincides with 'point A'.

The relation between the common resource block number $$n_{CRB}^{\mu}$$

in the frequency domain and resource elements (k,l) for subcarrier spacing configuration $\mu$ is given by $$n_{CRB}^{\mu} = \left\lfloor \frac{k}{N_{sc}^{RB}} \right\rfloor$$

where k is defined relative to point A such that k=0 corresponds to the subcarrier centered around point A.

4.4.4.4 Physical Resource Blocks

Physical resource blocks for subcarrier configuration $\mu$ are defined within a bandwidth part and numbered from 0 to $$N_{BWP,i}^{size,\mu} - 1$$

where i is the number of the bandwidth part. The relation between the physical resource block $$n_{PRB}^{\mu}$$

in bandwidth part i and the common resource block $$n_{CRB}^{\mu}$$

is given by $$n_{CRB}^{\mu} = n_{PRB}^{\mu} + N_{BWP,i}^{start,\mu}$$

where $$N_{BWP,i}^{start,\mu}$$

is the common resource block where bandwidth part starts relative to common resource block 0. When there is no risk for confusion the index $\mu$ may be dropped.

4.4.4.5 Virtual Resource Blocks

Virtual resource blocks are defined within a bandwidth part and numbered from 0 to +

$$N_{BWP,i}^{size} - 1$$

where i is the number of the bandwidth part.

4.4.5 Bandwidth Part

A bandwidth part is a subset of contiguous common resource blocks defined in subclause 4.4.4.3 for a given numerology $\mu_i$ in bandwidth part i on a given carrier. The starting position $$N_{BWP,i}^{start,\mu}$$

and the number of resource blocks $$N_{BWP,i}^{size,\mu}$$

in a bandwidth part shall fulfil $$N_{grid,x}^{start,\mu} \leq N_{BWP,i}^{start,\mu} < N_{grid,x}^{start,\mu} + N_{grid,x}^{size,\mu} \text{ and } N_{grid,x}^{start,\mu} <$$

$$N_{BWP,i}^{start,\mu} + N_{BWP,i}^{size,\mu} \leq N_{grid,x}^{start,\mu} + N_{grid,x}^{size,\mu},$$

respectively. Configuration of a bandwidth part is described in clause 12 of [5, TS 38.213]. A UE can be configured with up to four bandwidth parts in the downlink with a single downlink bandwidth part being active at a given time. The UE is not expected to receive PDSCH, PDCCH, or CSI-RS (except for RRM) outside an active bandwidth part.

A UE can be configured with up to four bandwidth parts in the uplink with a single uplink bandwidth part being active at a given time. If a UE is configured with a supplementary uplink, the UE can in addition be configured with up to four bandwidth parts in the supplementary uplink with a single supplementary uplink bandwidth part being active at a given time. The UE shall not transmit PUSCH or PUCCH outside an active bandwidth part. For an active cell, the UE shall not transmit SRS outside an active bandwidth part.

Unless otherwise noted, the description in this specification applies to each of the bandwidth parts. When there is no risk of confusion, the index $\mu$ may be dropped from $$N_{BWP,i}^{start,\mu}, N_{BWP,i}^{size,\mu}, N_{grid,x}^{start,\mu}, \text{ and } N_{grid,x}^{size,\mu}.$$

4.5 Carrier Aggregation

Transmissions in multiple cells can be aggregated. Unless otherwise noted, the description in this specification applies to each of the serving cells.

Slot format information (SFI) is introduced to indicate transmission direction for a symbol(s), e.g. Downlink (DL), Uplink (UL) or Flexible. SFI could be indicated or revealed by several signals, such as Radio Resource Control (RRC) configuration, Downlink Control Information (DCI) for SFI, scheduling DCI. Some handling would be then required if more than one direction is indicated to a symbol. More details regarding SFI is provided in 3GPP TS 38.213 V16.6.0 as follows:

11.1 Slot Configuration

A slot format includes downlink symbols, uplink symbols, and flexible symbols.

The following are applicable for each serving cell.

If a UE is provided tdd-UL-DL-ConfigurationCommon, the UE sets the slot format per slot over a number of slots as indicated by tdd-UL-DL-ConfigurationCommon.

The tdd-UL-DL-ConfigurationCommon provides a reference SCS configuration $\mu_{ref}$ by referenceSubcarri-erSpacing a pattern1.

The pattern1 provides a slot configuration period of P msec by dl-UL-Transmis-sionPeriodicity a number of slots $d_{slots}$ with only downlink symbols by nrofDownlinkSlots a number of downlink symbols $d_{sym}$ by nrofDownlinkS-ymbols a number of slots $u_{slots}$ with only uplink symbols by nrofUplinkSlots a number of uplink symbols $u_{sym}$ by nrofUplinkSymbols If tdd-UL-DL-ConfigurationCommon provides both pat-tern1 and pattern2, the UE sets the slot format per slot over a first number of slots as indicated by pattern1 and the UE sets the slot format per slot over a second number of slots as indicated by pattern2.

The pattern2 provides a slot configuration period of $P_2$ msec by dl-UL-Trans-missionPeriodicity a number of slots $d_{slots}$; with only downlink symbols by nrofDownlinkSlots a number of downlink symbols $d_{sym,2}$ by nrofDownlinkS-ymbols a number of slots $u_{slots,2}$ with only uplink symbols by nrofUplinkSlots a number of uplink symbols $u_{sym,2}$ by nrofUplinkSymbols The applicable values of $P_2$ are same as the applicable values for P.

From the $S_2$ slots, a first $d_{slots,2}$ slots include only down-link symbols and a last $u_{slots,2}$ include only uplink symbols. The $d_{sym,2}$ symbols after the first $d_{slots,2}$ slots are downlink symbols. The $u_{sym,2}$ symbols before the last $u_{slots,2}$ slots are uplink symbols. The remaining $$(S_2 - d_{slots,2} - u_{slots,2}) \cdot N_{symb}^{slot} - d_{sym,2} - u_{sym,2}$$

are flexible symbols.

If the UE is additionally provided tdd-UL-DL-Configu-rationDedicated, the parameter tdd-UL-DL-Configuration-Dedicated overrides only flexible symbols per slot over the number of slots as provided by tdd-UL-DL-Configuration-Common.

The tdd-UL-DL-ConfigurationDedicated provides a set of slot configurations by slotSpecificConfiguration-sToAddModList for each slot configuration from the set of slot configu-rations a slot index for a slot provided by slotIndex a set of symbols for a slot by symbols where if symbols=allDownlink, all symbols in the slot are downlink if symbols=allUplink, all symbols in the slot are uplink if symbols=explicit, nrofDownlinkSymbols provides a number of downlink first symbols in the slot and nrofUplinkSymbols provides a number of uplink last symbols in the slot. If nrofDownlinkSymbols is not provided, there are no downlink first symbols in the slot and if nrofUplinkSymbols is not provided, there are no uplink last symbols in the slot. The remaining symbols in the slot are flexible For each slot having a corresponding index provided by slotIndex, the UE applies a format provided by a corresponding symbols. The UE does not expect tdd-UL-DL-ConfigurationDedicated to indicate as uplink or as downlink a symbol that tdd-UL-DL-ConfigurationCommon indicates as a downlink or as an uplink symbol, respectively. For each slot configuration provided by tdd-UL-DL-Configuration-Dedicated, a reference SCS configuration is the reference SCS configuration $\mu_{ref}$ provided by tdd-UL-DL-Configura-tionCommon.

A slot configuration period and a number of downlink symbols, uplink symbols, and flexible symbols in each slot of the slot configuration period are determined from tdd-UL-DL-ConfigurationCommon and tdd-UL-DL-Configura-tionDedicated and are common to each configured BWP.

A UE considers symbols in a slot indicated as downlink by tdd-UL-DL-ConfigurationCommon, or tdd-UL-DL-Con-figurationDedicated to be available for receptions and con-siders symbols in a slot indicated as uplink by tdd-UL-DL-ConfigurationCommon, or by tdd-UL-DL-ConfigurationDedicated to be available for transmissions.

If a UE is not configured to monitor PDCCH for DCI format 2_0, for a set of symbols of a slot that are indicated as flexible by tdd-UL-DL-ConfigurationCommon and tdd-UL-DL-ConfigurationDedicated if provided, or when tdd-UL-DL-ConfigurationCommon and tdd-UL-DL-Configura-tionDedicated are not provided to the UE the UE receives PDSCH or CSI-RS in the set of symbols of the slot if the UE receives a corresponding indication by a DCI format the UE transmits PUSCH, PUCCH, PRACH, or SRS in the set of symbols of the slot if the UE receives a corresponding indication by a DCI format, a RAR UL grant, fallbackRAR UL grant, or successRAR For operation on a single carrier in unpaired spectrum, if a UE is configured by higher layers to receive a PDCCH, or a PDSCH, or a CSI-RS, or a DL PRS in a set of symbols of a slot, the UE receives the PDCCH, the PDSCH, the CSI-RS, or the DL PRS if the UE does not detect a DCI format that indicates to the UE to transmit a PUSCH, a PUCCH, a PRACH, or a SRS in at least one symbol of the set of symbols of the slot; otherwise, the UE does not receive the PDCCH, or the PDSCH, or the CSI-RS, or the DL PRS in the set of symbols of the slot.

For operation on a single carrier in unpaired spectrum, if a UE is configured by higher layers to transmit SRS, or PUCCH, or PUSCH, or PRACH in a set of symbols of a slot and the UE detects a DCI format indicating to the UE to receive CSI-RS or PDSCH in a subset of symbols from the set of symbols, then If the UE does not indicate the capability of [partialCa-ncellation], the UE does not expect to cancel the transmission of the PUCCH or PUSCH or PRACH in the set of symbols if the first symbol in the set occurs within $T_{proc,2}$ relative to a last symbol of a CORESET where the UE detects the DCI format; otherwise, the UE cancels the PUCCH, or the PUSCH, or an actual repetition of the PUSCH [6, TS38.214], determined from clauses 9 and 9.2.5 or clause 6.1 of [6, TS38.214], or the PRACH transmission in the set of symbols.

If the UE indicates the capability of [partialCancellation], the UE does not expect to cancel the transmission of the PUCCH or PUSCH or PRACH in symbols from the set of symbols that occur within $T_{proc,2}$ relative to a last symbol of a CORESET where the UE detects the DCI format. The UE cancels the PUCCH, or the PUSCH, or an actual repetition of the PUSCH [6, TS 38.214], determined from clauses 9 and 9.2.5 or clause 6.1 of [6, TS 38.214], or the PRACH transmission in remaining symbols from the set of symbols.

The UE does not expect to cancel the transmission of SRS in symbols from the subset of symbols that occur within $T_{proc,2}$ relative to a last symbol of a CORESET where the UE detects the DCI format. The UE cancels the SRS transmission in remaining symbols from the subset of symbols.

$T_{proc,2}$ is the PUSCH preparation time for the corresponding UE processing capability [6, TS 38.214] assuming $d_{2,1}=1$ and $\mu$ corresponds to the smallest SCS configuration between the SCS configuration of the PDCCH carrying the DCI format and the SCS configuration of the SRS, PUCCH, PUSCH or $\mu_r$, where $\mu_r$ corresponds to the SCS configuration of the PRACH if it is 15 kHz or higher; otherwise $\mu_r=0$.

For a set of symbols of a slot that are indicated to a UE as uplink by tdd-UL-DL-ConfigurationCommon, or tdd-UL-DL-ConfigurationDedicated, the UE does not receive PDCCH, PDSCH, or CSI-RS when the PDCCH, PDSCH, or CSI-RS overlaps, even partially, with the set of symbols of the slot.

For a set of symbols of a slot that are indicated to a UE as uplink by tdd-UL-DL-ConfigurationCommon, or tdd-UL-DL-ConfigurationDedicated, the UE does not receive DL PRS in the set of symbols of the slot, if the UE is not provided with a measurement gap. For a set of symbols of a slot that are indicated to a UE as downlink by tdd-UL-DL-ConfigurationCommon, or tdd-UL-DL-Configuration-Dedicated, the UE does not transmit PUSCH, PUCCH, PRACH, or SRS when the PUSCH, PUCCH, PRACH, or SRS overlaps, even partially, with the set of symbols of the slot.

For a set of symbols of a slot that are indicated to a UE as flexible by tdd-UL-DL-ConfigurationCommon, and tdd-UL-DL-ConfigurationDedicated if provided, the UE does not expect to receive both dedicated higher layer parameters configuring transmission from the UE in the set of symbols of the slot and dedicated higher layer parameters configuring reception by the UE in the set of symbols of the slot.

For operation on a single carrier in unpaired spectrum, for a set of symbols of a slot indicated to a UE by ssb-PositionsInBurst in SIB1 or ssb-PositionsInBurst in Serv-ingCellConfigCommon, for reception of SS/PBCH blocks, the UE does not transmit PUSCH, PUCCH, PRACH in the slot if a transmission would overlap with any symbol from the set of symbols and the UE does not transmit SRS in the set of symbols of the slot. The UE does not expect the set of symbols of the slot to be indicated as uplink by tdd-UL-DL-ConfigurationCommon, or tdd-UL-DL-Configuration-Dedicated, when provided to the UE.

For a set of symbols of a slot corresponding to a valid PRACH occasion and $N_{gap}$ symbols before the valid PRACH occasion, as described in clause 8.1, the UE does not receive PDCCH, PDSCH, or CSI-RS in the slot if a reception would overlap with any symbol from the set of symbols. The UE does not expect the set of symbols of the slot to be indicated as downlink by tdd-UL-DL-Configura-tionCommon or tdd-UL-DL-ConfigurationDedicated.

For a set of symbols of a slot indicated to a UE by pdcch-ConfigSIB1 in MIB for a CORESET for Type0-PDCCH CSS set, the UE does not expect the set of symbols to be indicated as uplink by tdd-UL-DL-ConfigurationCom-mon, or tdd-UL-DL-ConfigurationDedicated.

If a UE is scheduled by a DCI format to receive PDSCH over multiple slots, and if tdd-UL-DL-ConfigurationCom-mon, or tdd-UL-DL-ConfigurationDedicated, indicate that, for a slot from the multiple slots, at least one symbol from a set of symbols where the UE is scheduled PDSCH reception in the slot is an uplink symbol, the UE does not receive the PDSCH in the slot. If a UE is scheduled by a DCI format to transmit PUSCH over multiple slots, and if tdd-UL-DL-ConfigurationCommon, or tdd-UL-DL-ConfigurationDedi-cated, indicates that, for a slot from the multiple slots, at least one symbol from a set of symbols where the UE is scheduled PUSCH transmission in the slot is a downlink symbol, the UE does not transmit the PUSCH in the slot.

11.1.1 UE Procedure for Determining Slot Format

If a UE is configured by higher layers with parameter SlotFormatIndicator, the UE is provided an SFI-RNTI by sfi-RNTI and with a payload size of DCI format 2_0 by dci-PayloadSize. The UE is also provided in one or more serving cells with a configuration for a search space set s and a corresponding CORESET p for monitoring $$M_{p,s}^{(L_{SFI})}$$

PDCCH candidates for DCI format 2_0 with a CCE aggre-gation level of $L_{SFI}$ CCEs as described in clause 10.1. The $$M_{p,s}^{(L_{SFI})}$$

PDCCH candidates are the first $$M_{p,s}^{(L_{SFI})}$$

PDCCH candidates for CCE aggregation level $L_{SFI}$ for search space set s in CORESET p.

For each serving cell in the set of serving cells, the UE can be provided:

an identity of the serving cell by servingCellId a location of a SFI-index field in DCI format 2_0 by positionInDCI a set of slot format combinations by slotFormatCombi-nations, where each slot format combination in the set of slot format combinations includes one or more slot formats indicated by a respective slot-Formats for the slot format combination, and a mapping for the slot format combination provided by slotFormats to a corresponding SFI-index field value in DCI format 2_0 provided by slotFormatCombinationId for unpaired spectrum operation, a reference SCS con-figuration $\mu_{SFI}$ by subcarrierSpacing and, when a supplementary UL carrier is configured for the serving cell, a reference SCS configuration $\mu_{SFI,SUL}$ by subcar-rierSpacing2 for the supplementary UL carrier for paired spectrum operation, a reference SCS configu-ration $\mu_{SFI,DL}$ for a DL BWP by subcarrierSpacing and a reference SCS configuration $\mu_{SFI,UL}$ for an UL BWP by subcarrierSpacing2 a location of an available RB set indicator field in DCI format 2_0 that is one bit, if intraCellGuardBandsDL-List for the serving cell indicates no intra-cell guard-bands are configured, where a value of '1' indicates that the serving cell is available for receptions, a value of '0' indicates that the serving cell is not available for receptions, by avail-ableRB-SetsPerCell, and the serving cell remains available or unavailable for reception until the end of the remaining channel occupancy duration a bitmap having a one-to-one mapping with the RB sets [6, TS 38.214] of the serving cell, if intraCellGuard-BandsDL-List for the serving cell indicates intra-cell guard-bands are configured, where the bitmap includes $N_{RB,set,DL}$ bits and $N_{RB,set,DL}$ is the number of RB sets in the serving cell, a value of '1' indicates that an RB set is available for receptions, a value of '0' indicates that an RB set is not available for receptions, by availableRB-SetsPerCell and a RB set remains available or unavailable for receptions until the end of the remaining channel occupancy duration A SFI-index field value in a DCI format 2_0 indicates to a UE a slot format for each slot in a number of slots for each DL BWP or each UL BWP starting from a slot where the UE detects the DCI format 2_0. The number of slots is equal to or larger than a PDCCH monitoring periodicity for DCI format 2_0. The SFI-index field includes max{[log₂(maxS-FIindex+1],1} bits where maxSFIindex is the maximum value of the values provided by corresponding slotFormat-CombinationId. A slot format is identified by a corresponding format index as provided in Table 11.1.1-1 where 'D' denotes a downlink symbol, 'U' denotes an uplink symbol, and 'F' denotes a flexible symbol.

If a PDCCH monitoring periodicity for DCI format 2_0, provided to a UE for the search space set s by monitoring-SlotPeriodicityAndOffset, is smaller than a duration of a slot format combination the UE obtains at a PDCCH monitoring occasion for DCI format 2_0 by a corresponding SFI-index field value, and the UE detects more than one DCI formats 2_0 indicating a slot format for a slot, the UE expects each of the more than one DCI formats 2_0 to indicate a same format for the slot.

A UE does not expect to be configured to monitor PDCCH for DCI format 2_0 on a second serving cell that uses larger SCS than the serving cell.

[Table 11.1.1-1 of 3GPP TS 38.213 V16.6.0, Entitled "Slot Formats for Normal Cyclic Prefix", is Reproduced as FIG. 6]

For unpaired spectrum operation for a UE on a serving cell, the UE is provided by subcarrierSpacing a reference SCS configuration $\mu_{SFI}$ for each slot format in a combination of slot formats indicated by an SFI-index field value in DCI format 2_0. The UE expects that for a reference SCS configuration $\mu_{SFI}$ and for an active DL BWP or an active UL BWP with SCS configuration it is $\mu$, it is $\mu \geq \mu_{SFI}$. Each slot format in the combination of slot formats indicated by the SFI-index field value in DCI format 2_0 is applicable to $2^{(\mu-\mu_{SFI})}$ consecutive slots in the active DL BWP or the active UL BWP where the first slot starts at a same time as a first slot for the reference SCS configuration $\mu_{SFI}$ and each downlink or flexible or uplink symbol for the reference SCS configuration $\mu_{SFI}$ corresponds to $2^{(\mu-\mu_{SFI})}$ consecutive downlink or flexible or uplink symbols for the SCS configuration $\mu$.

For a set of symbols of a slot, a UE does not expect to detect a DCI format 2_0 with an SFI-index field value indicating the set of symbols of the slot as uplink and to detect a DCI format indicating to the UE to receive PDSCH or CSI-RS in the set of symbols of the slot. For a set of symbols of a slot, a UE does not expect to detect a DCI format 2_0 with an SFI-index field value indicating the set of symbols in the slot as downlink and to detect a DCI format, a RAR UL grant, fallbackRAR UL grant, or successRAR indicating to the UE to transmit PUSCH, PUCCH, PRACH, or SRS in the set of symbols of the slot.

For a set of symbols of a slot that are indicated by a DCI format 2_0 as being within a remaining channel occupancy duration either by a channel occupancy duration field or by an SFI-index field, a UE does not expect to detect at a later time a DCI format 2_0 indicating, either by a channel occupancy duration field or by an SFI-index field, that any symbol from the set of symbols is not within a remaining channel occupancy duration.

For a set of symbols of a slot that are indicated as downlink/uplink by tdd-UL-DL-ConfigurationCommon, or tdd-UL-DL-ConfigurationDedicated, the UE does not expect to detect a DCI format 2_0 with an SFI-index field value indicating the set of symbols of the slot as uplink/downlink, respectively, or as flexible.

For a set of symbols of a slot corresponding to SS/PBCH blocks with candidate SS/PBCH block indices corresponding to the SS/PBCH block indexes indicated to a UE by ssb-PositionsInBurst in SIB1, or by ssb-PositionsInBurst in ServingCellConfigCommon, as described in clause 4.1, the UE does not expect to detect a DCI format 2_0 with an SFI-index field value indicating the set of symbols of the slot as uplink.

For a set of symbols of a slot corresponding to a valid PRACH occasion and $N_{gap}$ symbols before the valid PRACH occasion, as described in clause 8.1, the UE does not expect to detect a DCI format 2_0 with an SFI-index field value indicating the set of symbols of the slot as downlink.

For a set of symbols of a slot indicated to a UE by pdcch-ConfigSIB1 in MIB for a CORESET for Type0-PDCCH CSS set, the UE does not expect to detect a DCI format 2_0 with an SFI-index field value indicating the set of symbols of the slot as uplink.

For a set of symbols of a slot indicated to a UE as flexible by tdd-UL-DL-ConfigurationCommon and tdd-UL-DL-ConfigurationDedicated if provided, or when tdd-UL-DL-ConfigurationCommon and tdd-UL-DL-ConfigurationDedicated are not provided to the UE, and if the UE detects a DCI format 2_0 providing a format for the slot using a slot format value other than 255 if one or more symbols from the set of symbols are symbols in a CORESET configured to the UE for PDCCH monitoring, the UE receives PDCCH in the CORESET only if an SFI-index field value in DCI format 2_0 indicates that the one or more symbols are downlink symbols if an SFI-index field value in DCI format 2_0 indicates the set of symbols of the slot as flexible and the UE detects a DCI format indicating to the UE to receive PDSCH or CSI-RS in the set of symbols of the slot, the UE receives PDSCH or CSI-RS in the set of symbols of the slot if an SFI-index field value in DCI format 2_0 indicates the set of symbols of the slot as flexible and the UE detects a DCI format, a RAR UL grant, fallbackRAR UL grant, or successRAR indicating to the UE to transmit PUSCH, PUCCH, PRACH, or SRS in the set of symbols of the slot the UE transmits the PUSCH, PUCCH, PRACH, or SRS in the set of symbols of the slot if an SFI-index field value in DCI format 2_0 indicates the set of symbols of the slot as flexible, and the UE does not detect a DCI format indicating to the UE to receive PDSCH or CSI-RS, or the UE does not detect a DCI format, a RAR UL, fallbackRAR UL grant, or successRAR grant indicating to the UE to transmit PUSCH, PUCCH, PRACH, or SRS in the set of symbols of the slot, the UE does not transmit or receive in the set of symbols of the slot if the UE is configured by higher layers to receive PDSCH or CSI-RS in the set of symbols of the slot, the UE receives the PDSCH or the CSI-RS in the set of symbols of the slot only if an SFI-index field value in DCI format 2_0 indicates the set of symbols of the slot as downlink and, if applicable, the set of symbols is within remaining channel occupancy duration if the UE is configured by higher layers to receive DL PRS in the set of symbols of the slot, the UE receives the DL PRS in the set of symbols of the slot only if an SFI-index field value in DCI format 2_0 indicates the set of symbols of the slot as downlink or flexible.

if the UE is configured by higher layers to transmit PUCCH, or PUSCH, or PRACH in the set of symbols of the slot, the UE transmits the PUCCH, or the PUSCH, or the PRACH in the slot only if an SFI-index field value in DCI format 2_0 indicates the set of symbols of the slot as uplink if the UE is configured by higher layers to transmit SRS in the set of symbols of the slot, the UE transmits the SRS only in a subset of symbols from the set of symbols of the slot indicated as uplink symbols by an SFI-index field value in DCI format 2_0 a UE does not expect to detect an SFI-index field value in DCI format 2_0 indicating the set of symbols of the slot as downlink and also detect a DCI format, a RAR UL grant, fallbackRAR UL grant, or successRAR indicating to the UE to transmit SRS, PUSCH, PUCCH, or PRACH, in one or more symbols from the set of symbols of the slot a UE does not expect to detect an SFI-index field value in DCI format 2_0 indicating the set of symbols of the slot as downlink or flexible if the set of symbols of the slot includes symbols corresponding to any repetition of a PUSCH transmission activated by an UL Type 2 grant PDCCH as described in clause 10.2 a UE does not expect to detect an SFI-index field value in DCI format 2_0 indicating the set of symbols of the slot as uplink and also detect a DCI format indicating to the UE to receive PDSCH or CSI-RS in one or more symbols from the set of symbols of the slot If a UE is configured by higher layers to receive a CSI-RS or a PDSCH in a set of symbols of a slot and the UE detects a DCI format 20 with a slot format value other than 255 that indicates a slot format with a subset of symbols from the set of symbols as uplink or flexible, or the UE detects a DCI format indicating to the UE to transmit PUSCH, PUCCH, SRS, or PRACH in at least one symbol in the set of the symbols, the UE cancels the CSI-RS reception in the set of symbols of the slot or cancels the PDSCH reception in the slot.

For operation with shared spectrum channel access, if a UE is configured by higher layers to receive a CSI-RS and the UE is provided CO-DurationsPerCell, for a set of symbols of a slot that are indicated as downlink or flexible by tdd-UL-DL-ConfigurationCommon or tdd-UL-DL-ConfigurationDedicated, or when tdd-UL-DL-ConfigurationCommon and tdd-UL-DL-ConfigurationDedicated are not provided, the UE cancels the CSI-RS reception in the set of symbols of the slot that are not within the remaining channel occupancy duration.

If a UE is configured by higher layers to receive a DL PRS in a set of symbols of a slot and the UE detects a DCI format 20 with a slot format value other than 255 that indicates a slot format with a subset of symbols from the set of symbols as uplink, or the UE detects a DCI format indicating to the UE to transmit PUSCH, PUCCH, SRS, or PRACH in at least one symbol in the set of the symbols, the UE cancels the DL PRS reception in the set of symbols of the slot.

If a UE is configured by higher layers to transmit SRS, or PUCCH, or PUSCH, or PRACH in a set of symbols of a slot and the UE detects a DCI format 2_0 with a slot format value other than 255 that indicates a slot format with a subset of symbols from the set of symbols as downlink or flexible, or the UE detects a DCI format indicating to the UE to receive CSI-RS or PDSCH in a subset of symbols from the set of symbols, then If the UE does not indicate the capability of [partialCancellation], the UE does not expect to cancel the transmission of the PUCCH or PUSCH or PRACH in the set of symbols if the first symbol in the set occurs within $T_{proc,2}$ relative to a last symbol of a CORESET where the UE detects the DCI format; otherwise, the UE cancels the PUCCH, or the PUSCH, or an actual repetition of the PUSCH [6, TS38.214], determined from clauses 9 and 9.2.5 or clause 6.1 of [6, TS38.214], or the PRACH transmission in the set of symbols.

If the UE indicates the capability of [partialCancellation], the UE does not expect to cancel the transmission of the PUCCH or PUSCH or PRACH in symbols from the set of symbols that occur within $T_{proc,2}$ relative to a last symbol of a CORESET where the UE detects the DCI format. The UE cancels the PUCCH, or the PUSCH, or an actual repetition of the PUSCH [6, TS 38.214], determined from clauses 9 and 9.2.5 or clause 6.1 of [6, TS 38.214], or the PRACH transmission in remaining symbols from the set of symbols.

The UE does not expect to cancel the transmission of SRS in symbols from the subset of symbols that occur within $T_{proc,2}$ relative to a last symbol of a CORESET where the UE detects the DCI format. The UE cancels the SRS transmission in remaining symbols from the subset of symbols.

$T_{proc,2}$ is the PUSCH preparation time for the corresponding UE processing capability [6, TS 38.214] assuming d 2,1=1 and μ corresponds to the smallest SCS configuration between the SCS configuration of the PDCCH carrying the DCI format and the SCS configuration of the SRS, PUCCH, PUSCH or $μ_r$, where $μ_r$ corresponds to the SCS configuration of the PRACH if it is 15 kHz or higher; otherwise $μ_r$=0.

If a UE is configured by higher layers to receive a CSI-RS or detects a DCI format 0_1 indicating to the UE to receive a CSI-RS in one or more RB sets and a set of symbols of a slot, and the UE detects a DCI format 2_0 with bitmap indicating that any RB set from the one or more RB sets is not available for reception, the UE cancels the CSI-RS reception in the set of symbols of the slot. A UE assumes that flexible symbols in a CORESET configured to the UE for PDCCH monitoring are downlink symbols if the UE does not detect an SFI-index field value in DCI format 2_0 indicating the set of symbols of the slot as flexible or uplink and the UE does not detect a DCI format indicating to the UE to transmit SRS, PUSCH, PUCCH, or PRACH in the set of symbols. For a set of symbols of a slot that are indicated as flexible by tdd-UL-DL-ConfigurationCommon, and tdd-UL-DL-ConfigurationDedicated if provided, or when tdd-UL-DL-ConfigurationCommon, and tdd-UL-DL-ConfigurationDedicated are not provided to the UE, and if the UE does not detect a DCI format 2_0 providing a slot format for the slot the UE receives PDSCH or CSI-RS in the set of symbols of the slot if the UE receives a corresponding indication by a DCI format the UE transmits PUSCH, PUCCH, PRACH, or SRS in the set of symbols of the slot if the UE receives a corresponding indication by a DCI format, a RAR UL grant, fallbackRAR UL grant, or successRAR the UE receives PDCCH as described in clause 10.1 if the UE is configured by higher layers to receive PDSCH in the set of symbols of the slot, the UE does not receive the PDSCH in the set of symbols of the slot if the UE is configured by higher layers to receive CSI-RS in the set of symbols of the slot, the UE does not receive the CSI-RS in the set of symbols of the slot, except when UE is provided CO-DurationsPerCell and the set of symbols of the slot are within the remaining channel occupancy duration.

if the UE is configured by higher layers to receive DL PRS in the set of symbols of the slot, the UE receives the DL PRS if the UE is configured by higher layers to transmit SRS, or PUCCH, or PUSCH, or PRACH in the set of symbols of the slot and the UE is not provided enable-ConfiguredUL, then if the UE does not indicate the capability of [partialCancellation], the UE does not expect to cancel the transmission of the PUCCH, or the PUSCH, or an actual repetition of the PUSCH [6, TS 38.214], as determined in clauses 9 and 9.2.5 or in clause 6.1 of [6. TS 38.214], or the PRACH in the slot if the first symbol of the PUCCH or the PUSCH or actual repetition of the PUSCH or the PRACH in the slot occurs within $T_{proc,2}$ relative to a last symbol of a CORESET where the UE is configured to monitor PDCCH for DCI format 2_0; otherwise, the UE cancels the PUCCH, or the PUSCH, or an actual repetition of the PUSCH [6, TS 38.214], as determined in clauses 9 and 9.2.5 or in clause 6.1 of [6. TS 38.214], or the PRACH in the slot;

if the UE indicates the capability of [partialCancellation], the UE does not expect to cancel the transmission of the PUCCH, or the PUSCH, or an actual repetition of the PUSCH [6, TS 38.214], as determined in clauses 9 and 9.2.5 or in clause 6.1 of [6. TS 38.214], or the PRACH in symbols from the set of symbols that occur within $T_{proc,2}$ relative to a last symbol of a CORESET where the UE is configured to monitor PDCCH for DCI format 2_0. The UE cancels the PUCCH, or the PUSCH, or an actual repetition of the PUSCH [6, TS 38.214], as determined in clauses 9 and 9.2.5 or in clause 6.1 of [6. TS 38.214], or the PRACH transmission in remaining symbols from the set of symbols;

the UE does not expect to cancel the transmission of SRS in symbols from the set of symbols that occur within $T_{proc,2}$ relative to a last symbol of a CORESET where the UE is configured to monitor PDCCH for DCI format 2_0. The UE cancels the SRS transmission in remaining symbols from the set of symbols;

$T_{proc,2}$ is the PUSCH preparation time for the corresponding UE processing capability [6, TS 38.214] assuming d 2,1=1 and μ corresponds to the smallest SCS configuration between the SCS configuration of the PDCCH carrying the DCI format 2_0 and the SCS configuration of the SRS, PUCCH, PUSCH or $μ_r$, where $μ_r$ corresponds to the SCS configuration of the PRACH if it is 15 kHz or higher; otherwise $μ_r=0$;

if the UE is configured by higher layers to transmit SRS, or PUCCH, or PUSCH, or PRACH in the set of symbols of the slot and the UE is provided enableConfiguredUL, the UE can transmit the SRS, or PUCCH, or PUSCH, or PRACH, respectively.

For unpaired spectrum operation for a UE on a cell in a frequency band of FR1, and when the scheduling restrictions due to RRM measurements [10, TS 38.133] are not applicable, if the UE detects a DCI format indicating to the UE to transmit in a set of symbols, the UE is not required to perform RRM measurements [10, TS 38.133] based on a SS/PBCH block or CSI-RS reception on a different cell in the frequency band if the SS/PBCH block or CSI-RS reception includes at least one symbol from the set of symbols.

Channel state information (CSI) is reported by a UE to a base station so as to provide channel quality related information to the base station, e.g. CQI, PMI, RI, L1-RSRP, L1-SINR, CRI, SSBRI, . . . . UE would perform measurement on reference signal, e.g. CSI-RS, on certain time frequency resource, e.g. reference resource, derives the corresponding information and report to the base station. The time resource where measurement is performed could be within a proper slot prior to the report, e.g. based on valid downlink slot. The time resource would take several constraints into account, such as whether the slot comprises DL symbol and/or a time gap in-between (e.g. between the slot and the report) is sufficient for a UE to finish the measurement and preparation for the report. Frequency resource where measurement is performed could be subject to content/type of the report. For example, a wideband report could be generated based on measurement on wideband frequency resource, e.g. across carrier bandwidth or BWP bandwidth. A subband report could be generated based on measurement on subband resource, e.g. part of or subset of carrier bandwidth or BWP bandwidth. More details related to CSI report and reference resource could be found in 3GPP TS 38.213 V16.10.0 as follows:

5.2 UE Procedure for Reporting Channel State Information (CSI)

5.2.1 Channel State Information Framework

The procedures on aperiodic CSI reporting described in this clause assume that the CSI reporting is triggered by DCI format 0_1, but they equally apply to CSI reporting triggered by DCI format 0_2, by applying the higher layer parameter reportTriggerSizeDCI-0-2 instead of reportTriggerSize.

The time and frequency resources that can be used by the UE to report CSI are controlled by the gNB. CSI may consist of Channel Quality Indicator (CQI), precoding matrix indicator (PMI), CSI-RS resource indicator (CRI), SS/PBCH Block Resource indicator (SSBRI), layer indicator (LI), rank indicator (RI), L1-RSRP or L1-SINR.

5.2.1.2 Resource Settings

Each CSI Resource Setting CSI-ResourceConfig contains a configuration of a list of S≥1_ CSI Resource Sets (given by higher layer parameter csi-RS-ResourceSetList), where the list is comprised of references to either or both of NZP CSI-RS resource set(s) and SS/PBCH block set(s) or the list is comprised of references to CSI-IM resource set(s). Each CSI Resource Setting is located in the DL BWP identified by the higher layer parameter BWP-id, and all CSI Resource Settings linked to a CSI Report Setting have the same DL BWP.

5.2.1.4 Reporting Configurations

The UE shall calculate CSI parameters (if reported) assuming the following dependencies between CSI parameters (if reported)

LI shall be calculated conditioned on the reported CQI, PMI, RI and CRI

CQI shall be calculated conditioned on the reported PMI, RI and CRI

PMI shall be calculated conditioned on the reported RI and CRI

RI shall be calculated conditioned on the reported CRI.

The Reporting configuration for CSI can be aperiodic (using PUSCH), periodic (using PUCCH) or semi-persistent (using PUCCH, and DCI activated PUSCH). The CSI-RS Resources can be periodic, semi-persistent, or aperiodic. Table 5.2.1.4-1 shows the supported combinations of CSI Reporting configurations and CSI-RS Resource configurations and how the CSI Reporting is triggered for each CSI-RS Resource configuration. Periodic CSI-RS is configured by higher layers. Semi-persistent CSI-RS is activated and deactivated as described in Clause 5.2.1.5.2. Aperiodic CSI-RS is configured and triggered/activated as described in Clause 5.2.1.5.1.

For CSI reporting, a UE can be configured via higher layer signaling with one out of two possible subband sizes, where a subband is defined as $$N_{PRB}^{SB}$$

contiguous PRBs and depends on the total number of PRBs in the bandwidth part according to Table 5.2.1.4-2.

[Table 5.2.1.4-2 of 3GPP TS 38.213 V16.10.0, Entitled "Configurable Subband Sizes", is Reproduced as FIG. 7]

The reportFreqConfiguration contained in a CSI-Report-Config indicates the frequency granularity of the CSI Report. A CSI Reporting Setting configuration defines a CSI reporting band as a subset of subbands of the bandwidth part, where the reportFreqConfiguration indicates:

the csi-ReportingBand as a contiguous or non-contiguous subset of subbands in the bandwidth part for which CSI shall be reported.

A UE is not expected to be configured with csi-ReportingBand which contains a subband where a CSI-RS resource linked to the CSI Report setting has the frequency density of each CSI-RS port per PRB in the subband less than the configured density of the CSI-RS resource.

If a CSI-IM resource is linked to the CSI Report Setting, a UE is not expected to be configured with csi-ReportingBand which contains a subband where not all PRBs in the subband have the CSI-IM REs present.

wideband CQI or subband CQI reporting, as configured by the higher layer parameter cqi-FormatIndicator. When wideband CQI reporting is configured, a wideband CQI is reported for each codeword for the entire CSI reporting band. When subband CQI reporting is configured, one CQI for each codeword is reported for each subband in the CSI reporting band.

wideband PMI or subband PMI reporting as configured by the higher layer parameter pmi-FormatIndicator. When wideband PMI reporting is configured, a wideband PMI is reported for the entire CSI reporting band. When subband PMI reporting is configured, except with 2 antenna ports, a single wideband indication (i1 in Clause 5.2.2.2) is reported for the entire CSI reporting band and one subband indication (i2 in clause 5.2.2.2) is reported for each subband in the CSI reporting band. When subband PMIS are configured with 2 antenna ports, a PMI is reported for each subband in the CSI reporting band.

a UE is not expected to be configured with pmi-FormatIndicator if codebookType is set to 'typeII-r16' or 'typeII-PortSelection-r16'.

A CSI Reporting Setting is said to have a wideband frequency-granularity if reportQuantity is set to 'cri-RI-PMI-CQI', or 'cri-RI-LI-PMI-CQI', cqi-FormatIndicator is set to Twideband-CQI' and pmi-FormatIndicator is set to 'wideband-PMI', or reportQuantity is set to 'cri-RI-i1' or reportQuantity is set to 'cri-RI-CQI' or 'cri-RI-i1-CQI' and cqi-FormatIndicator is set to 'widebandCQI', or reportQuantity is set to 'cri-RSRP' or 'ssb-Index-RSRP' or 'cri-SINR', or 'ssb-Index-SINR' otherwise, the CSI Reporting Setting is said to have a subband frequency-granularity.

If the UE is configured with a CSI Reporting Setting for a bandwidth part with fewer than 24 PRBs, the CSI reporting setting is expected to have a wideband frequency-granularity, and, if applicable, the higher layer parameter codebook-Type is set to 'typeI-SinglePanel'.

The first subband size is given by $$N_{PRB}^{SB} - \left(N_{BWP,i}^{start} \bmod N_{PRB}^{SB}\right)$$

and the last subband size given by $$\left(N_{BWP,i}^{start} + N_{BWP,i}^{size}\right) \bmod N_{PRB}^{SB} \text{ if } \left(N_{BWP,i}^{start} + N_{BWP,i}^{size}\right) \bmod N_{PRB}^{SB} \neq$$
$$0 \text{ and } N_{PRB}^{SB} \text{ if } \left(N_{BWP,i}^{start} + N_{BWP,i}^{size}\right) \bmod N_{PRB}^{SB} = 0$$

If a UE is configured with semi-persistent CSI reporting, the UE shall report CSI when both CSI-IM and NZP CSI-RS resources are configured as periodic or semi-persistent. If a UE is configured with aperiodic CSI reporting, the UE shall report CSI when both CSI-IM and NZP CSI-RS resources are configured as periodic, semi-persistent or aperiodic.

A UE configured with DCI format 0_1 or 0_2 does not expect to be triggered with multiple CSI reports with the same CSI-ReportConfigId.

5.2.2 Channel State Information

5.2.2.1 Channel Quality Indicator (CQI)

The CQI indices and their interpretations are given in Table 5.2.2.1-2 or Table 5.2.2.1-4 for reporting CQI based on QPSK, 16QAM and 64QAM. The CQI indices and their interpretations are given in Table 5.2.2.1-3 for reporting CQI based on QPSK, 16QAM, 64QAM and 256QAM. Based on an unrestricted observation interval in time unless specified otherwise in this Clause, and an unrestricted observation interval in frequency, the UE shall derive for each CQI value reported in uplink slot n the highest CQI index which satisfies the following condition:

A single PDSCH transport block with a combination of modulation scheme, target code rate and transport block size corresponding to the CQI index, and occupying a group of downlink physical resource blocks termed the CSI reference resource, could be received with a transport block error probability not exceeding:

0.1, if the higher layer parameter cqi-Table in CSI-ReportConfig configures 'table1' (corresponding to Table 5.2.2.1-2), or 'table2' (corresponding to Table 5.2.2.1-3), or 0.00001, if the higher layer parameter cqi-Table in CSI-ReportConfig configures 'table3' (corresponding to Table 5.2.2.1-4).

If the higher layer parameter timeRestrictionForChannelMeasurements is set to "notConfigured", the UE shall derive the channel measurements for computing CSI value reported in uplink slot n based on only the NZP CSI-RS, no later than the CSI reference resource, (defined in TS 38.211 [4]) associated with the CSI resource setting.

If the higher layer parameter timeRestrictionForChannelMeasurements in CSI-ReportConfig is set to "Configured", the UE shall derive the channel measurements for computing CSI reported in uplink slot n based on only the most recent, no later than the CSI reference resource, occasion of NZP CSI-RS (defined in [4, TS 38.211]) associated with the CSI resource setting. If the higher layer parameter timeRestrictionForInterferenceMeasurements is set to "notConfigured", the UE shall derive the interference measurements for computing CSI value reported in uplink slot n based on only the CSI-IM and/or NZP CSI-RS for interference measurement no later than the CSI reference resource associated with the CSI resource setting. If the higher layer parameter timeRestrictionForInterferenceMeasurements in CSI-ReportConfig is set to "Configured", the UE shall derive the interference measurements for computing the CSI value reported in uplink slot n based on the most recent, no later than the CSI reference resource, occasion of CSI-IM and/or NZP CSI-RS for interference measurement (defined in [4, TS 38.211]) associated with the CSI resource setting.

For each sub-band index s, a 2-bit sub-band differential CQI is defined as:

Sub-band Offset level (s)=sub-band CQI index (s)—wideband CQI index.

The mapping from the 2-bit sub-band differential CQI values to the offset level is shown in Table 5.2.2.1-1

[Table 5.2.2.1-1 of 3GPP TS 38.213 V16.10.0, Entitled "Mapping Sub-Band Differential CQI Value to Offset Level, is Reproduced as FIG. 8]

A combination of modulation scheme and transport block size corresponds to a CQI index if:

the combination could be signaled for transmission on the PDSCH in the CSI reference resource according to the Transport Block Size determination described in Clause and the modulation scheme is indicated by the CQI index, and the combination of transport block size and modulation scheme when applied to the reference resource results in the effective channel code rate which is the closest possible to the code rate indicated by the CQI index. If more than one combination of transport block size and modulation scheme results in an effective channel code rate equally close to the code rate indicated by the CQI index, only the combination with the smallest of such transport block sizes is relevant.

[Table 5.2.2.1-2 of 3GPP TS 38.213 V16.10.0, Entitled "4-Bit CQI Table", is Reproduced as FIG. 9]

[Table 5.2.2.1-3 of 3GPP TS 38.213 V16.10.0, Entitled "4-Bit CQI Table 2", is Reproduced as FIG. 10]

[Table 5.2.2.1-4 of 3GPP TS 38.213 V16.10.0, Entitled "4-Bit CQI Table 3", is Reproduced as FIG. 11]

5.2.2.3 Reference Signal (CSI-RS)

5.2.2.3.1 NZP CSI-RS

The UE can be configured with one or more NZP CSI-RS resource set configuration(s) as indicated by the higher layer parameters CSI-ResourceConfig, and NZP-CSI-RS-ResourceSet. Each NZP CSI-RS resource set consists of K≤1 NZP CSI-RS resource(s).

The following parameters for which the UE shall assume non-zero transmission power for CSI-RS resource are configured via the higher layer parameter NZP-CSI-RS-Resource, CSI-ResourceConfig and NZP-CSI-RS-ResourceSet for each CSI-RS resource configuration:

nzp-CSI-RS-ResourceId determines CSI-RS resource configuration identity.

periodicityAndOffset defines the CSI-RS periodicity and slot offset for periodic/semi-persistent CSI-RS. All the CSI-RS resources within one set are configured with the same periodicity, while the slot offset can be same or different for different CSI-RS resources.

resourceMapping defines the number of ports, CDM-type, and OFDM symbol and subcarrier occupancy of the CSI-RS resource within a slot that are given in Clause 7.4.1.5 of [4, TS 38.211].

nrofPorts in resourceMapping defines the number of CSI-RS ports, where the allowable values are given in Clause 7.4.1.5 of [4, TS 38.211].

density in resourceMapping defines CSI-RS frequency density of each CSI-RS port per PRB, and CSI-RS PRB offset in case of the density value of ½, where the allowable values are given in Clause 7.4.1.5 of [4, TS 38.211]. For density ½, the odd/even PRB allocation indicated in density is with respect to the common resource block grid.

cdm-Type in resourceMapping defines CDM values and pattern, where the allowable values are given in Clause 7.4.1.5 of [4, TS 38.211].

powerControlOffset: which is the assumed ratio of PDSCH EPRE to NZP CSI-RS EPRE when UE derives CSI feedback and takes values in the range of [−8, 15] dB with 1 dB step size.

powerControlOffsetSS: which is the assumed ratio of NZP CSI-RS EPRE to SS/PBCH block EPRE.

scramblingID defines scrambling ID of CSI-RS with length of 10 bits.

BWP-Id in CSI-ResourceConfig defines which bandwidth part the configured CSI-RS is located in.

repetition in NZP-CSI-RS-ResourceSet is associated with a CSI-RS resource set and defines whether UE can assume the CSI-RS resources within the NZP CSI-RS Resource Set are transmitted with the same downlink spatial domain transmission filter or not as described in Clause 5.1.6.1.2. and can be configured only when the higher layer parameter reportQuantity associated with all the reporting settings linked with the CSI-RS resource set is set to 'cri-RSRP', 'cri-SINR' or 'none'.

qcl-InfoPeriodicCSI-RS contains a reference to a TCI-State indicating QCL source RS(s) and QCL type(s). If the TCI-State is configured with a reference to an RS configured with qcl-Type set to 'typeD' association, that RS may be an SS/PBCH block located in the same or different CC/DL BWP or a CSI-RS resource configured as periodic located in the same or different CC/DL BWP.

trs-Info in NZP-CSI-RS-ResourceSet is associated with a CSI-RS resource set and for which the UE can assume that the antenna port with the same port index of the configured NZP CSI-RS resources in the NZP-CSI-RS- ResourceSet is the same as described in Clause and can be configured when reporting setting is not configured or when the higher layer parameter reportQuantity associated with all the reporting settings linked with the CSI-RS resource set is set to 'none'.

All CSI-RS resources within one set are configured with same density and same nrofPorts, except for the NZP CSI-RS resources used for interference measurement.

The UE expects that all the CSI-RS resources of a resource set are configured with the same starting RB and number of RBs and the same cdm-type.

The bandwidth and initial common resource block (CRB) index of a CSI-RS resource within a BWP, as defined in Clause 7.4.1.5 of [4, TS 38.211], are determined based on the higher layer parameters nrofRBs and startingRB, respectively, within the CSI-FrequencyOccupation IE configured by the higher layer parameter freqBand within the CSI-RS-ResourceMapping IE. Both nrofRBs and startingRB are configured as integer multiples of 4 RBs, and the reference point for startingRB is CRB 0 on the common resource block grid. If $$\text{starting } RB < N_{BWP}^{start},$$

the UE shall assume that the initial CRB index of the CSI-RS resource is $$N_{initial\ RB} = N_{BWP}^{start},$$

otherwise $$N_{initial\ RB} = \text{starting } RB. \text{ If } nrofRBs > N_{BWP}^{size} + N_{BWP}^{start} - N_{initial\ RB},$$

the UE shall assume that the bandwidth of the CSI-RS resource is $$N_{CSI-RS}^{BW} = N_{BWP}^{size} + N_{BWP}^{start} - N_{inititial\ RB},$$

otherwise $$N_{CSI-RS}^{BW} = nrofRBs.$$

In all cases, the UE shall expect that $$N_{CSI-RS}^{BW} \geq \min(24, N_{BWP}^{size}).$$

5.2.2.5 CSI Reference Resource Definition

The CSI reference resource for a serving cell is defined as follows:

In the frequency domain, the CSI reference resource is defined by the group of downlink physical resource blocks corresponding to the band to which the derived CSI relates.

In the time domain, the CSI reference resource for a CSI reporting in uplink slot n' is defined by a single downlink slot n-nCSI_ref, where $$n = \left\lfloor n' \cdot \frac{2^{\mu_{DL}}}{2^{\mu_{UL}}} \right\rfloor + \left\lfloor \left( \frac{N_{slot,offset,UL}^{CA}}{2^{\mu_{offset,UL}}} - \frac{N_{slot,offset,DL}^{CA}}{2^{\mu_{offset,DL}}} \right) \cdot 2^{\mu_{DL}} \right\rfloor$$

and $\mu_{DL}$ and $\mu_{UL}$ are the subcarrier spacing configurations for DL and UL, respectively, and $$N_{slot,offset}^{CA}$$

and $\mu_{offset}$ are determined by higher-layer configured caSlotOffset for the cells transmitting the uplink and downlink, as defined in clause 4.5 of [4, TS 38.211]

where for periodic and semi-persistent CSI reporting if a single CSI-RS/SSB resource is configured for channel measurement nCSI_ref is the smallest value greater than or equal to $4 \cdot 2^{\mu_{DL}}$, such that it corresponds to a valid downlink slot, or if multiple CSI-RS/SSB resources are configured for channel measurement nCSI_ref is the smallest value greater than or equal to $5 \cdot 2^{\mu_{DL}}$, such that it corresponds to a valid downlink slot.

where for aperiodic CSI reporting, if the UE is indicated by the DCI to report CSI in the same slot as the CSI request, nCSI_ref is such that the reference resource is in the same valid downlink slot as the corresponding CSI request, otherwise nCSI_ref is the smallest value greater than or equal to $$\lfloor Z'/N_{symb}^{slot} \rfloor,$$

such that slot n-nCSI_ref corresponds to a valid downlink slot, where Z' corresponds to the delay requirement as defined in Clause 5.4.

when periodic or semi-persistent CSI-RS/CSI-IM or SSB is used for channel/interference measurements, the UE is not expected to measure channel/interference on the CSI-RS/CSI-IM/SSB whose last OFDM symbol is received up to Z' symbols before transmission time of the first OFDM symbol of the aperiodic CSI reporting.

A slot in a serving cell shall be considered to be a valid downlink slot if:

it comprises at least one higher layer configured downlink or flexible symbol, and it does not fall within a configured measurement gap for that UE If there is no valid downlink slot for the CSI reference resource corresponding to a CSI Report Setting in a serving cell, CSI reporting is omitted for the serving cell in uplink slot n'. After the CSI report (re)configuration, serving cell activation, BWP change, or activation of SP-CSI, the UE reports a CSI report only after receiving at least one CSI-RS transmission occasion for channel measurement and CSI-RS and/or CSI-IM occasion for interference measurement no later than CSI reference resource and drops the report otherwise.

When DRX is configured, the UE reports a CSI report only if receiving at least one CSI-RS transmission occasion for channel measurement and CSI-RS and/or CSI-IM occasion for interference measurement in DRX Active Time no later than CSI reference resource and drops the report otherwise. When the UE is configured to monitor DCI format 2_6 and if the UE configured by higher layer parameter ps-TransmitOtherPeriodicCSI to report CSI with the higher layer parameter reportConfigType set to 'periodic' and reportQuantity set to quantities other than 'cri-RSRP' and 'ssb-Index-RSRP' when drx-onDurationTimer is not started, the UE shall report CSI during the time duration indicated by drx-onDurationTimer in DRX-Config also outside active time according to the procedure described in Clause 5.2.1.4 if receiving at least one CSI-RS transmission occasion for channel measurement and CSI-RS and/or CSI-IM occasion for interference measurement during the time duration indicated by drx-onDurationTimer in DRX-Config outside DRX active time or in DRX Active Time no later than CSI reference resource and drops the report otherwise. When the UE is configured to monitor DCI format 2_6 and if the UE configured by higher layer parameter ps-TransmitPeriodicL1-RSRP to report L1-RSRP with the higher layer parameter reportConfigType set to 'periodic' and reportQuantity set to 'cri-RSRP' or 'ssb-Index-RSRP' when drx-onDurationTimer is not started, the UE shall report L1-RSRP during the time duration indicated by drx-onDurationTimer in DRX-Config also outside active time according to the procedure described in clause 5.2.1.4 and when reportQuantity set to 'cri-RSRP' if receiving at least one CSI-RS transmission occasion for channel measurement during the time duration indicated by drx-onDurationTimer in DRX-Config outside DRX active time or in DRX Active Time no later than CSI reference resource and drops the report otherwise. When deriving CSI feedback, the UE is not expected that a NZP CSI-RS resource for channel measurement overlaps with CSI-IM resource for interference measurement or NZP CSI-RS resource for interference measurement.

If configured to report CQI index, in the CSI reference resource, the UE shall assume the following for the purpose of deriving the CQI index, and if also configured, for deriving PMI and RI:

The first 2 OFDM symbols are occupied by control signaling.

The number of PDSCH and DM-RS symbols is equal to 12.

The same bandwidth part subcarrier spacing configured as for the PDSCH reception The bandwidth as configured for the corresponding CQI report.

The reference resource uses the CP length and subcarrier spacing configured for PDSCH reception No resource elements used by primary or secondary synchronization signals or PBCH.

Redundancy Version 0.

The ratio of PDSCH EPRE to CSI-RS EPRE is as given in Clause 5.2.2.3.1.

Assume no REs allocated for NZP CSI-RS and ZP CSI-RS.

Assume the same number of front-loaded DM-RS symbols as the maximum front-loaded symbols configured by the higher layer parameter maxLength in DMRS-DownlinkConfig.

Assume the same number of additional DM-RS symbols as the additional symbols configured by the higher layer parameter dmrs-AdditionalPosition.

Assume the PDSCH symbols are not containing DM-RS.

Assume PRB bundling size of 2 PRBs.

The PDSCH transmission scheme where the UE may assume that PDSCH transmission would be performed with up to 8 transmission layers as defined in Clause 7.3.1.4 of [4, TS 38.211]. For CQI calculation, the UE should assume that PDSCH signals on antenna ports in the set [1000, . . . , 1000+v−1] for v layers would result in signals equivalent to corresponding symbols transmitted on antenna ports [3000, . . . , 3000+P−1], as given by $$\begin{bmatrix} y^{(3000)}(i) \\ \dots \\ y^{(3000+P-1)}(i) \end{bmatrix} = W(i) \begin{bmatrix} x^{(0)}(i) \\ \dots \\ x^{(v-1)}(i) \end{bmatrix}$$

where $x(i)=[x^{(0)}(i) \dots x^{(v-1)}(i)]^T$ is a vector of PDSCH symbols from the layer mapping defined in Clause 7.3.1.4 of [4, TS 38.211], $P \in [1, 2, 4, 8, 12, 16, 24, 32]$ is the number of CSI-RS ports. If only one CSI-RS port is configured, W(i) is 1. If the higher layer parameter reportQuantity in CSI-ReportConfig for which the CQI is reported is set to either 'cri-RI-PMI-CQI' or 'cri-RI-LI-PMI-CQI', W(i) is the precoding matrix corresponding to the reported PMI applicable to x(i). If the higher layer parameter reportQuantity in CSI-ReportConfig for which the CQI is reported is set to 'cri-RI-CQI', W(i) is the precoding matrix corresponding to the procedure described in Clause 5.2.1.4.2. If the higher layer parameter reportQuantity in CSI-ReportConfig for which the CQI is reported is set to 'cri-RI-i1-CQI', W(i) is the precoding matrix corresponding to the reported i1 according to the procedure described in Clause 5.2.1.4.2. The corresponding PDSCH signals transmitted on antenna ports [3000, . . . , 3000+P−1] would have a ratio of EPRE to CSI-RS EPRE equal to the ratio given in Clause 5.2.2.3.1.

Duplexing enhancement has been discussed in 3GPP to enable more frequent UL so as to improve latency and UL coverage. UL transmission and DL transmission could occur on a same symbol for unpaired spectrum (e.g. TDD). More details regarding duplexing could be found in 3GPP RP-212707 as follows:

3 Justification

TDD is widely used in commercial NR deployments. In TDD, the time domain resource is split between downlink and uplink. Allocation of a limited time duration for the uplink in TDD would result in reduced coverage and increased latency. As a possible enhancement on this limitation of the conventional TDD operation, it would be worth studying the feasibility of allowing the simultaneous existence of downlink and uplink, a.k.a. full duplex, or more specifically, subband non-overlapping full duplex at the gNB side within a conventional TDD band. The NR TDD allows the dynamic/flexible allocation of downlink and uplink in time and CLI handling and RIM for NR were introduced in Rel-16. Nevertheless, further study may be required for CLI handling between the networks of different operators to enable the dynamic/flexible TDD in commercial networks. The inter-operator CLI may be due to either adjacent-channel CLI or co-channel-CLI, or both, depending on the deployment scenario. The main problem not addressed in the previous releases is gNB-to-gNB CLI. This study aims to identify the feasibility and solutions of duplex evolution in the areas outlined above to provide enhanced coverage, reduced latency, improved system capacity, and improved configuration flexibility for NR TDD operations in unpaired spectrum.

The objective of this study is to identify and evaluate the potential enhancements to support duplex evolution for NR TDD in unpaired spectrum.

In this study, the followings are assumed:

Duplex enhancement at the gNB side

Half duplex operation at the UE side

No restriction on frequency ranges

The detailed objectives are as follows:

Identify applicable and relevant deployment scenarios and use cases (RAN1).

Develop evaluation methodology for duplex enhancement (RAN1).

Study the subband non-overlapping full duplex and potential enhancements on dynamic/flexible TDD.

Identify possible schemes and evaluate their feasibility and performances (RAN1).

Study inter-gNB and inter-UE CLI handling and identify solutions to manage them (RAN1).

Study their impacts on inter-gNB interfaces if needed (RAN3).

Consider intra-subband CLI and inter-subband CLI in case of the subband non-overlapping full duplex.

Study the performance of the identified schemes as well as the impact on legacy operation assuming their co-existence in co-channel and adjacent channels (RAN1).

and the inter-operator CLI at gNB and the inter-subband CLI and inter-operator CLI at UE (RAN4).

Study the impact on RF requirements considering adjacent-channel co-existence with the legacy operation (RAN4).

RAN4 should be involved early to provide necessary information to RAN1 as needed and to study the feasibility aspects due to high impact in antenna/RF and algorithm design, which include antenna isolation, TX IM suppression in the RX part, filtering and digital interference suppression.

Summarize the regulatory aspects that have to be considered for deploying the identified duplex enhancements in TDD unpaired spectrum (RAN4).

Note: For potential enhancements on dynamic/flexible TDD, utilize the outcome of discussion in Rel-15 and Rel-16 while avoiding the repetition of the same discussion.

As discussed, the reference resource for Channel State Information (CSI) and/or valid downlink slot could be determined based on slot format, e.g. whether a slot comprise at least one symbol configured as Downlink (DL) or flexible. However, in legacy system, the slot format, e.g. transmission direction, is applicable across the carrier bandwidth. With introduction of duplex enhancement, SFI/transmission direction could be different for different frequency resources, e.g. different subbands. When determining reference resource for CSI, considering whether DL/flexible symbol is available may not be sufficient. For example, a UE may need to perform Uplink (UL) transmission in a slot/symbol which is considered as reference resource for CSI since both DL and UL could occur on a same symbol. The UE may not be able to measure CSI and perform UL transmission on a same symbol. In other words, even if DL/flexible symbol is available in a slot, CSI measurement/reporting may not be carried out properly in that slot due to presence of UL transmission. Some new way to find reference resource/valid downlink slot and/or to derive measurement result needs to be taken into account.

Figure 12:
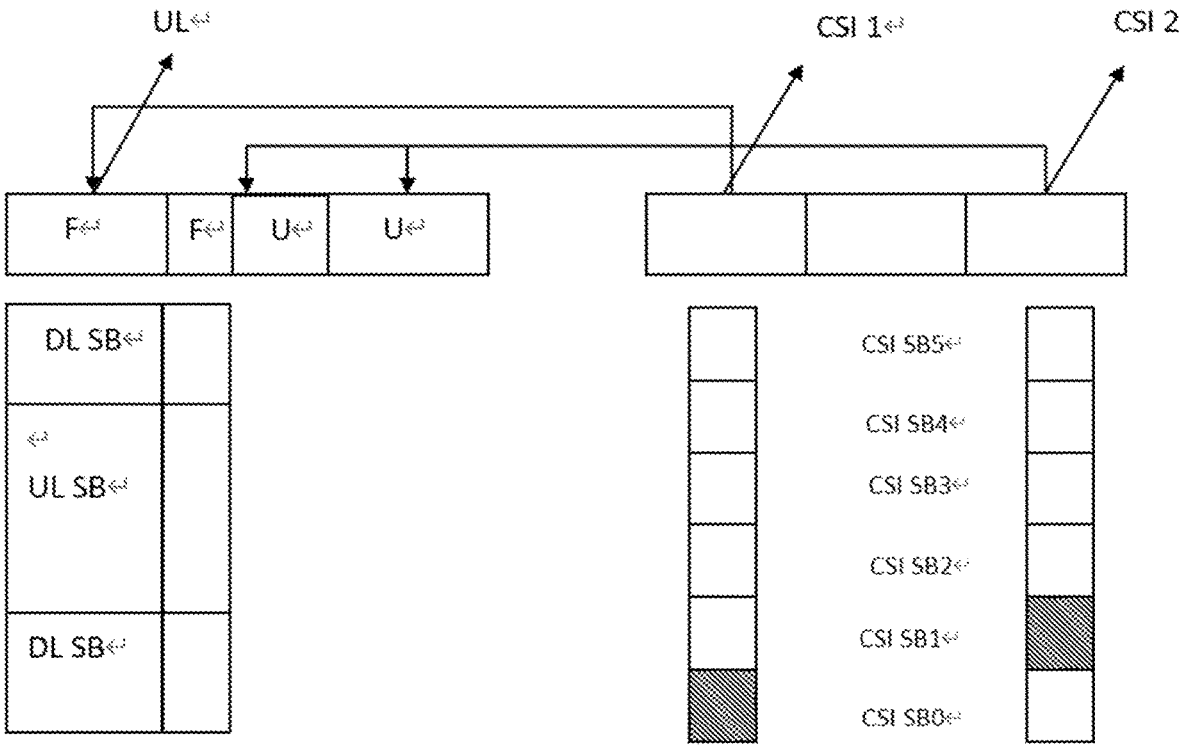
FIG. 12 is a diagram according to one exemplary embodiment.

An example is given in FIG. 12. As shown in FIG. 12, UE could be required to report CSI 1 for CSI subband 1, and the corresponding reference resource for CSI1 could be a slot comprising all symbol with flexible (F) configured. However, part of CSI subband 1 could be indicated as UL subband and part of CSI-subband 1 could be indicated as DL subband in the slot/symbol. Similarly, UE may be required to report CSI 2 for CSI subband 2, the corresponding reference resource for CSI 2 could be a slot comprising flexible symbol (s) and uplink symbol (e.g. as a previous slot comprising all UL symbols). However, CSI subband 2 could be indicated as within UL subband in the slot/symbol.

A first general concept of this invention is to find a proper slot as reference resource/valid downlink slot for a CSI/report when/if (all) frequency resource to be measured for the CSI/report is indicated as DL. For example, a slot when duplexing enhancement is not enabled/applicable may be used as reference resource/valid downlink slot. A slot may be considered as a valid DL slot if/when duplexing enhancement is not enabled/applicable for the slot. In another example, a slot whose frequency resource(s) indicated as DL covers (all) frequency resource to be measured for CSI may be used as reference resource/valid downlink slot. A slot may be considered as a valid DL slot if/when (all) frequency resource to be measured for CSI is indicated as DL. A slot may be considered as a valid DL slot if/when (all) frequency resource to be measured for CSI is within DL subband(s) (for duplex enhancement/SFI). A slot may be considered as a valid DL slot even if/when frequency resource not to be measured for CSI is indicated as UL. A slot may be considered as a valid DL slot even if/when frequency resource not to be measured for CSI is within UL subband(s) (for duplex enhancement/SFI).

Reference resource and/or valid downlink slot could be based on subband SFI and frequency resource to be measured for CSI. For a report comprises both subband CSI and wideband CSI, the reference resource could be in different slots. For example, reference resource of subband CSI may be in a first slot. (All) Frequency resource(s) to be measured for the subband CSI may be indicated as DL in the first slot. Some other frequency resources may be indicated as UL in the first slot. At least some frequency resources to be measured for the wideband CSI may be indicated as UL in the first slot.

Reference resource for the wideband CSI may not be the first slot. Reference resource for the wideband CSI may not be the first slot due to the at least some frequency resource being set to UL. Reference resource for the wideband CSI may be the second slot. (All) Frequency resource(s) to be measured for the wideband CSI is indicated as DL in the second slot. The second slot may be prior to the first slot. For a report comprises subband CSIs for two different CSI subband, the reference resource could be in different slots. For example, reference resource of subband CSI for a first CSI subband is in a first slot. (All) Frequency resource(s) to be measured for the subband CSI for a first CSI subband may be indicated as DL in the first slot. Some other frequency resources may be indicated as UL in the first slot. At least some/all frequency resources to be measured for subband CSI for a second CSI subband may be indicated as UL in the first slot.

Figure 13:
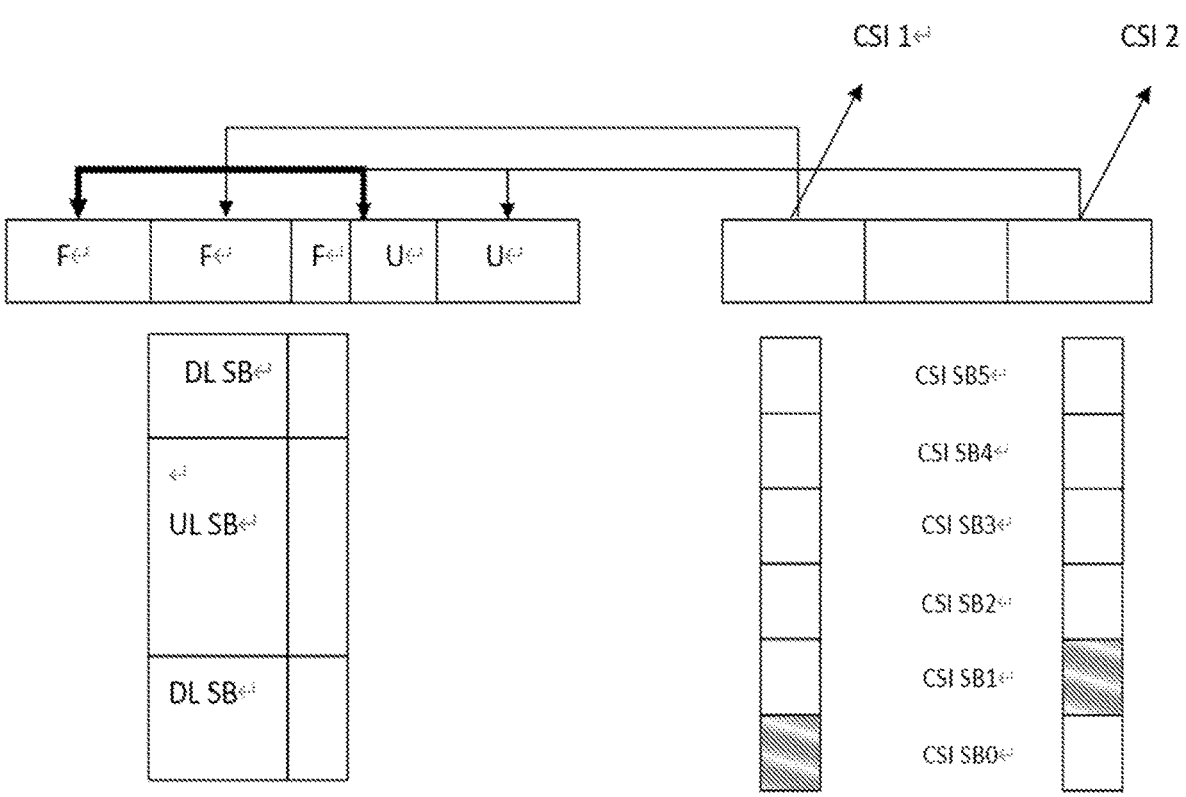
FIG. 13 is a diagram according to one exemplary embodiment.

Reference resource for subband CSI for a second CSI subband may not be the first slot. Reference resource for subband CSI for a second CSI subband is not the first slot due to at least some/all frequency resource to be measured for subband CSI for a second CSI subband is indicated as UL in the first slot. Reference resource for the subband CSI for a second CSI subband may be the second slot. (All) Frequency resource(s) to be measured for the subband CSI for a second subband may be indicated as DL in the second slot. The second slot may be prior to the first slot. An example is given in FIG. 13.

Figure 14:
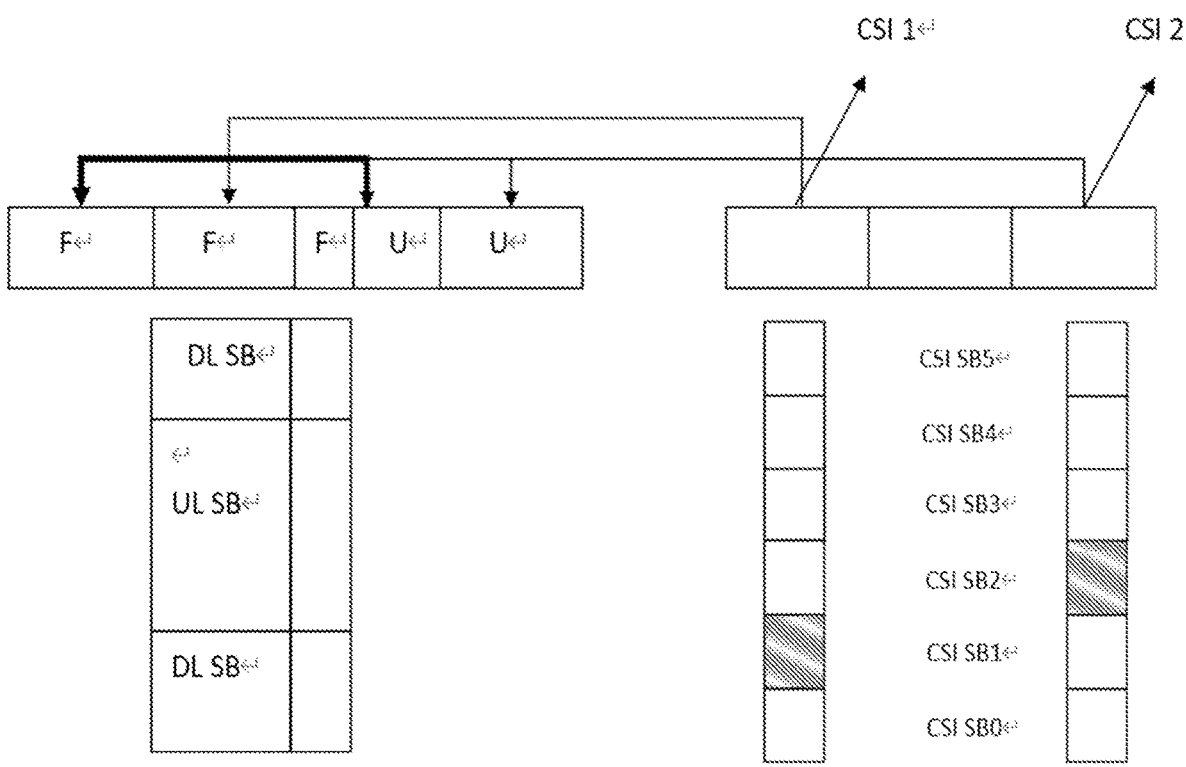
FIG. 14 is a diagram according to one exemplary embodiment.

A second general concept is to find a proper slot as reference resource/valid downlink slot for a CSI/report when/if at least part of frequency resource to be measured for the CSI/report is indicated as DL. A slot may be reference resource/valid downlink slot for CSI/report when/if frequency resource indicated as DL within the frequency resource to be measured for CSI/report is more than a threshold. A slot may not be reference resource/valid downlink slot for CSI/report when/if frequency resource indicated as DL within the frequency resource to be measured for CSI/report is less than a threshold. A slot may be reference resource/valid downlink slot for CSI/report when/if frequency resource indicated as DL within the frequency resource to be measured for CSI/report is more than a proportion, e.g. 50%. A slot may not be reference resource/ valid downlink slot for CSI/report when/if frequency resource indicated as DL within the frequency resource to be measured for CSI/report is less than a proportion. A slot may be reference resource/valid downlink slot for CSI/report when/if frequency resource indicated as DL within the frequency resource to be measured for CSI/report is more than a number of physical resource block (PRB), e.g. 4PRBs. A slot may not be reference resource/valid downlink slot for CSI/report when/if frequency resource indicated as DL within the frequency resource to be measured for CSI/ report is less than a number of physical resource block (PRB). The threshold/proportion/number of PRBs could be predefined or indicated by a base station. An example is given in FIG. 14.

Figure 15:
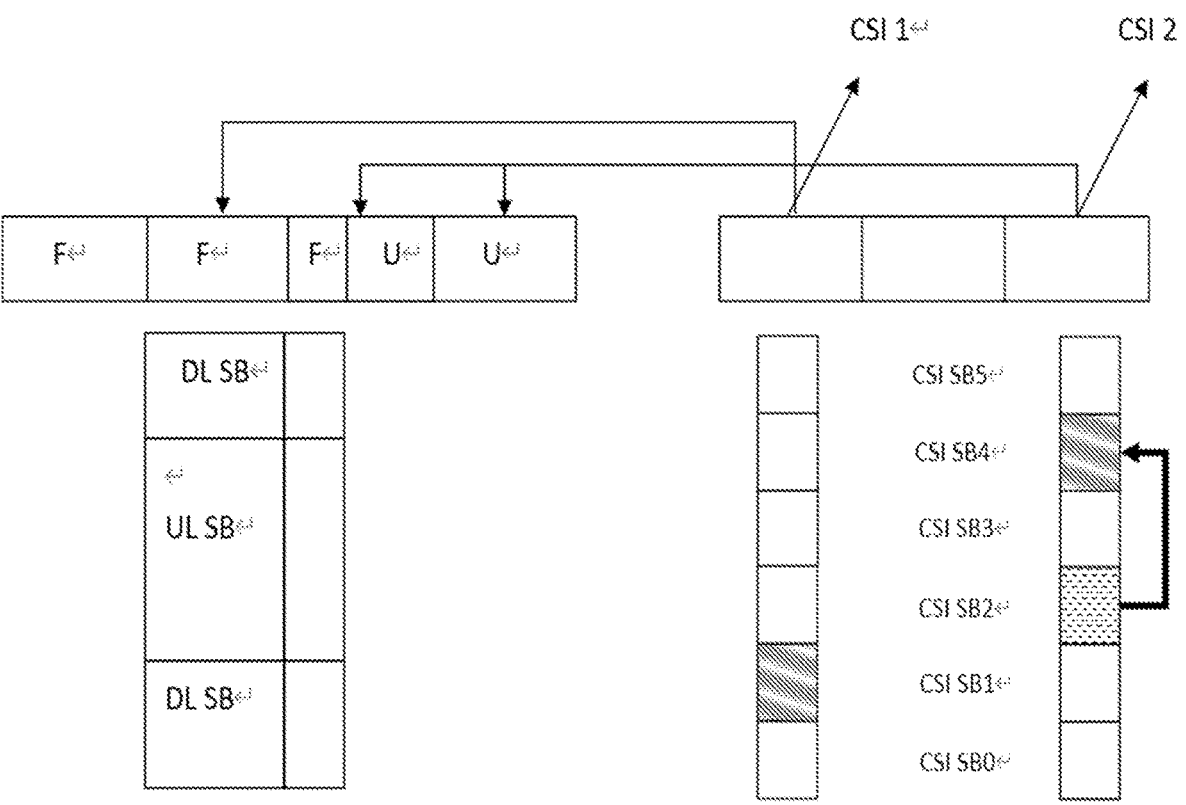
FIG. 15 is a diagram according to one exemplary embodiment.

A third general concept is to report CSI for a different frequency resource if/when (all/at least part of) frequency resource to be measured for CSI to be reported report is indicated as UL. UE may be indicated/configured to report CSI for a first frequency resource (e.g. a first CSI subband) in a reporting occasion. All/at least part of the first frequency resource may be indicated as UL in a reference resource of the CSI/report. CSI for a second frequency resource (e.g. a second subband) may be reported in the reporting occasion. CSI for a second frequency resource (e.g. a second subband) may be reported (instead of CSI for the first frequency resource) in the reporting occasion due to the first frequency resource being indicated as UL in the reference resource. A second frequency resource may be indicated as DL in the reference resource. A second frequency resource may be a next subband (of the first frequency resource). A second frequency resource may be a next subband (of the first frequency resource) indicated as DL. A second frequency resource may be next to the first frequency resource. A second frequency resource may be next to the first frequency resource and indicated as DL. A second frequency resource could be associated with a next reporting occasion. An example is given in FIG. 15.

Figure 16:
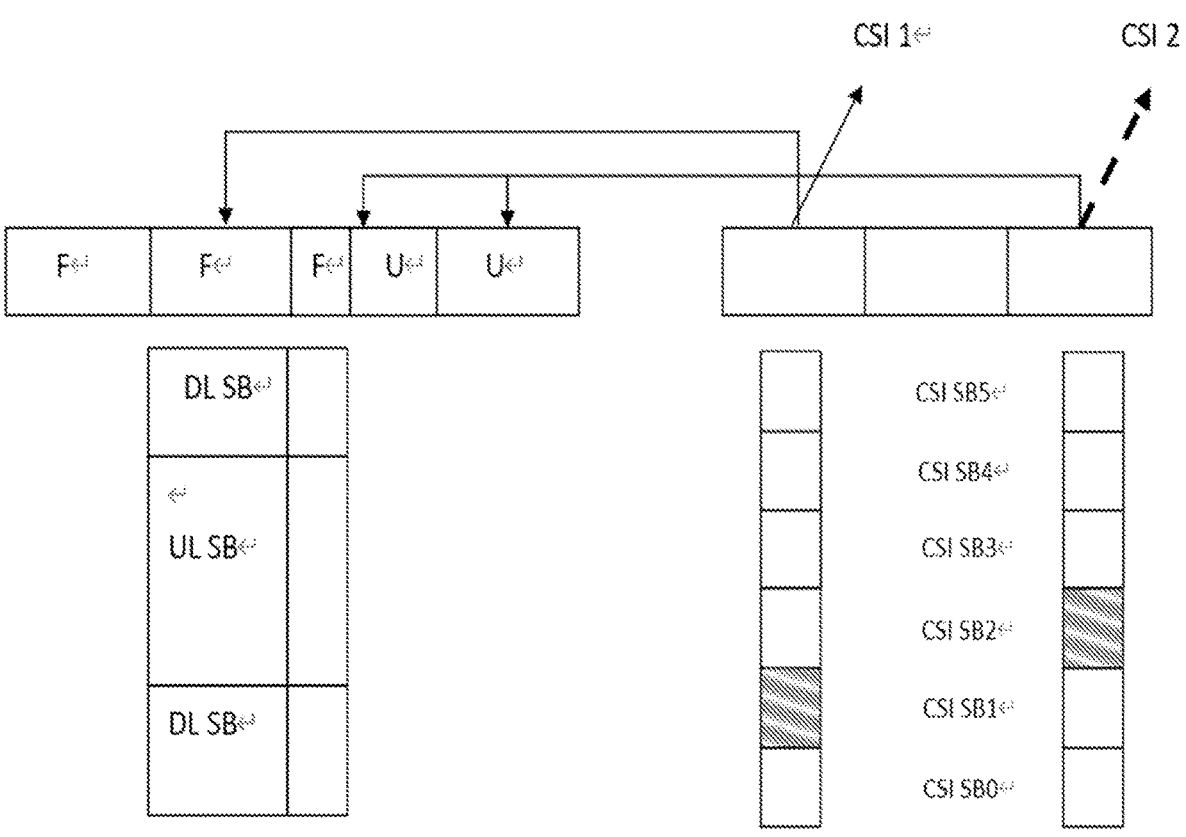
FIG. 16 is a diagram according to one exemplary embodiment.

A fourth general concept of this invention is to skip CSI report or provide predefine value for a CSI/report when/if at least part of/all frequency resource to be measured for the CSI/report is indicated as UL in a valid downlink slot or reference resource. A slot when some frequency resource to be measured for a CSI/report is indicated UL may be reference resource/valid downlink slot for the CSI/report. An example is given in FIG. 16.

In one embodiment, a UE may be configured/indicated to report CSI to a base station. The UE could measure reference signal in a slot for a report/CSI. The slot may be determined based on subband SFI (e.g. transmission direction for the subband). The slot may be determined based on subband SFI and frequency resource to be measured for the report/CSI. The slot may be determined based on whether (all) frequency resource to be measured for the report/CSI in the slot is indicated DL or not. A (first) slot may be measured for a CSI/report if/when (all) frequency resource to be measured for the report/CSI in the (first) slot is indicated DL. A (second) slot may not be measured for a CSI/report if/when (at least part of/all) frequency resource to be measured for the report/CSI in the (second) slot is indicated UL. The slot may be a valid downlink slot. The slot may comprise reference resource for CSI/report. Transmission direction of frequency resource may be indicated by subband SFI. A slot may be considered as a valid DL slot if/when duplexing enhancement is not enabled/applicable for the slot.

In another example, a slot whose frequency resource(s) indicated as DL covers (all) frequency resource to be measured for CSI may be used as reference resource/valid downlink slot. A slot may be considered as a valid DL slot if/when (all) frequency resource to be measured for CSI is indicated as DL. A slot may be considered as a valid DL slot if/when (all) frequency resource to be measured for CSI is within DL subband(s) (for duplex enhancement/SFI). A slot may be considered as a valid DL slot even if/when frequency resource not to be measured for CSI is indicated as UL. A slot may be considered as a valid DL slot even if/when frequency resource not to be measured for CSI is within UL subband(s) (for duplex enhancement/SFI).

Reference resource and/or valid downlink slot could be based on subband SFI and frequency resource to be measured for CSI. For a report comprises both subband CSI and wideband CSI, the reference resource could be in different slots. For example, reference resource of subband CSI may be in a first slot. (All) Frequency resource(s) to be measured for the subband CSI may be indicated as DL in the first slot. Some other frequency resources may be indicated as UL in the first slot. At least some frequency resources to be measured for the wideband CSI may be indicated as UL in the first slot.

Reference resource for the wideband CSI may not be the first slot. Reference resource for the wideband CSI may not be the first slot due to the at least some frequency resource being set to UL. Reference resource for the wideband CSI may be the second slot. (All) Frequency resource(s) to be measured for the wideband CSI may be indicated as DL in the second slot. The second slot may be prior to the first slot. For a report comprises subband CSIs for two different CSI subband, the reference resource could be in different slots. For example, reference resource of subband CSI for a first CSI subband is in a first slot. (All)Frequency resource(s) to be measured for the subband CSI for a first CSI subband may be indicated as DL in the first slot. Some other frequency resources may be indicated as UL in the first slot. At least some/all frequency resources to be measured for subband CSI for a second CSI subband may be indicated as UL in the first slot.

Reference resource for subband CSI for a second CSI subband may not be the first slot. Reference resource for subband CSI for a second CSI subband may not be the first slot due to at least some/all frequency resource to be measured for subband CSI for a second CSI subband is indicated as UL in the first slot. Reference resource for the subband CSI for a second CSI subband may be the second slot. (All) Frequency resource(s) to be measured for the subband CSI for a second subband may be indicated as DL in the second slot. The second slot may be prior to the first slot.

In another embodiment, a UE may be configured/indicated to report CSI to a base station. The UE could measure reference signal in a slot for a report/CSI. The slot may be determined based on subband SFI. The slot may be determined based on subband SFI and frequency resource to be measured for the report/CSI. The slot may be determined based on how many resource(s) within frequency resource to be measured for the report/CSI in the slot is indicated DL. The slot may be determined based on whether at least part of frequency resource to be measured for the report/CSI in the slot is indicated DL or not. The slot may be a slot where at least part of frequency resource to be measured for the report/CSI in the slot is indicated DL. The slot may be a slot where frequency resource to be measured for the report/CSI in the slot indicated DL is more than a threshold. The slot may not be a slot where frequency resource to be measured for the report/CSI in the slot indicated DL is no more than a threshold. The threshold could be in unit of proportion.

The slot may be a slot where frequency resource to be measured for the report/CSI in the slot indicated DL is more than a proportion. The slot may not be a slot where frequency resource to be measured for the report/CSI in the slot indicated DL is less than a proportion. The threshold could be in unit of PRB(s). The slot may be a slot where frequency resource to be measured for the report/CSI in the slot indicated DL is more than a number of PRB(s). The slot may not be a slot where frequency resource to be measured for the report/CSI in the slot indicated DL is less than a number of PRB(s). The threshold could be predefined. The proportion could be predefined. The number of PRBs could be predefined. The threshold could be indicated by a base station. The proportion could be indicated by a base station. The number of PRBs could be indicated by a base station.

In another embodiment, a UE may be configured/indicated to report CSI to a base station in a slot. The CSI may be associated with a first frequency resource. The CSI may be for a first frequency resource. A first frequency resource may be frequency resource to be measured for the CSI. All or at least part of the first frequency resource may be indicated as UL in reference resource/valid downlink slot. The UE may not report CSI for the first frequency resource in the slot (according to the configuration/indication). The UE may not report CSI for the first frequency resource in the slot due to all or at least part of the first frequency resource being indicated as UL in reference resource/valid downlink slot. The UE may report CSI for a second frequency resource (rather than for the first frequency resource) in the slot. The UE may report CSI for a second frequency resource (rather than for the first frequency resource) in the slot due to all or at least part of the first frequency resource being indicated as UL in reference resource/valid downlink slot. The UE may report CSI for a second frequency resource (rather than for the first frequency resource) in the slot due to (all of) the second frequency resource being indicated as DL in reference resource/valid downlink slot.

The second frequency resource may be different from the first frequency resource. The second frequency resource may be indicated as DL in reference resource/valid downlink slot. The second frequency resource may be a subband next to the first frequency resource. The second frequency resource may be next to the first frequency resource. The second frequency resource may be frequency resource to be measured for CSI in a next reporting occasion.

In another embodiment, a UE may be configured/indicated to report CSI to a base station. All or part of frequency resource to be measured for a report/CSI may be indicated as UL in reference resource/valid downlink subframe. The UE may not measure the frequency resource. The UE may not measure the frequency resource due to all or part of frequency resource to be measured for a report/CSI being indicated as UL in reference resource/valid downlink subframe. The UE may not report CSI for the frequency resource. The UE may skip/omit the report. Alternatively, the UE may report predefined value for CSI. The UE may not report CSI for the frequency resource due to all or part of frequency resource to be measured for a report/CSI being indicated as UL in reference resource/valid downlink subframe. The UE may skip/omit the report due to all or part of frequency resource to be measured for a report/CSI being indicated as UL in reference resource/valid downlink subframe. Alternatively, the UE may report predefined value for CSI due to all or part of frequency resource to be measured for a report/CSI being indicated as UL in reference resource/valid downlink subframe.

Throughout the invention, subband could be replaced by CSI subband, subband for CSI, subband for SFI, subband for duplex enhancement, subband for transmission direction, subband for subband SFI unless otherwise noted. Throughout the invention, transmission direction could be one or more of DL, UL, flexible, reserved, blank, sidelink.

Throughout the invention, the invention describes behavior or operation of a single serving cell unless otherwise noted. Throughout the invention, the invention describes behavior or operation of multiple serving cells unless otherwise noted. Throughout the invention, the invention describes behavior or operation of a single bandwidth part unless otherwise noted.

Throughout the invention, a base station configures multiple bandwidth parts to the UE unless otherwise noted. Throughout the invention, a base station configures a single bandwidth part to the UE unless otherwise noted.

Figure 17:
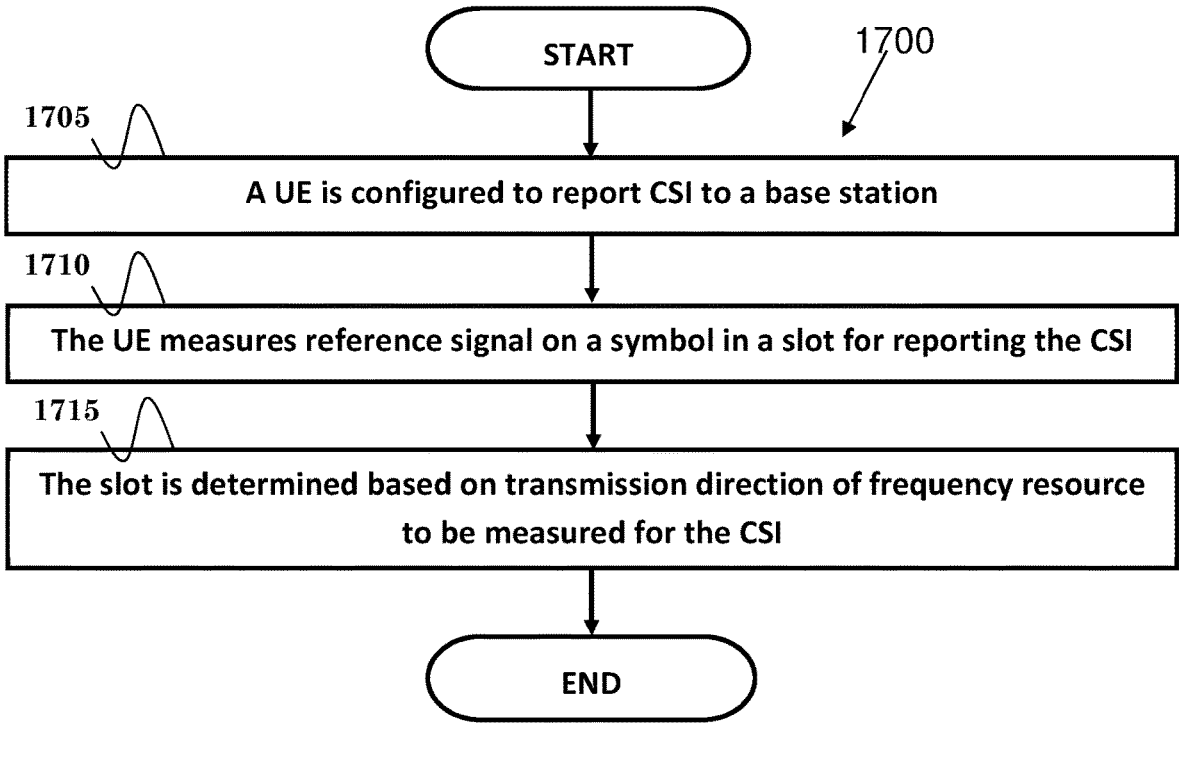
FIG. 17 is a flow chart according to one exemplary embodiment.

FIG. 17 is a flow chart 1700 of a method for channel state information reference resource. In step 1705, a UE is configured to report Channel State Information (CSI) to a base station. In step 1710, the UE measures reference signal on a symbol in a slot for reporting the CSI. In step 1715, the slot is determined based on transmission direction of frequency resource to be measured for the CSI.

In one embodiment, the slot may be a slot that transmission direction of all frequency resource to be measured for the CSI in the slot is DL on the symbol. The slot may be a slot that transmission direction of at least part of frequency resource to be measured for the CSI in the slot is DL on the symbol. The frequency resource to be measured for the CSI may be wideband. A wideband may be measured for the CSI. The frequency resource to be measured for the CSI may be a CSI subband. A CSI subband is measured for the CSI. In one embodiment, the CSI is a wideband CSI. In one embodiment, the CSI is a subband CSI.

Referring back to FIGS. 3 and 4, in one exemplary embodiment of a method for a UE, the UE 300 includes a program code 312 stored in the memory 310, wherein the UE is configured to report CSI to a base station. The CPU 308 could execute program code 312 to enable the UE (i) to measure reference signal on a symbol in a slot for reporting the CSI, and (ii) to determine the slot based on transmission direction of frequency resource to be measured for the CSI. Furthermore, the CPU 308 can execute the program code 312 to perform all of the above-described actions and steps or others described herein.

Figure 18:
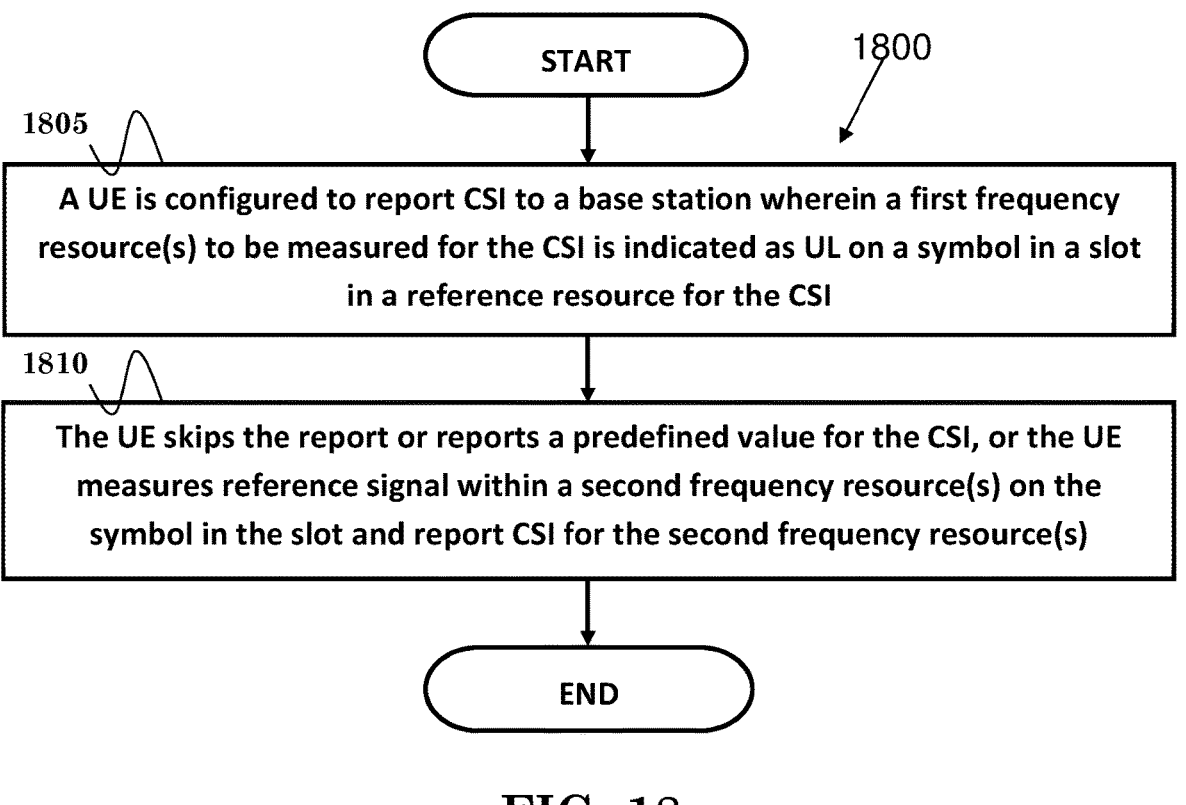
FIG. 18 is a flow chart according to one exemplary embodiment.

FIG. 18 is a flow chart 1800 of a method for channel state information reference resource. In step 1805, a UE is configured to report CSI to a base station wherein a first frequency resource(s) to be measured for the CSI is indicated as UL on a symbol in a slot in a reference resource for the CSI. In step 1810, the UE skips the report or reports a predefined value for the CSI, or the UE measures reference signal within a second frequency resource(s) on the symbol in the slot and report CSI for the second frequency resource(s).

Referring back to FIGS. 3 and 4, in one exemplary embodiment of a method for a UE, the UE 300 includes a program code 312 stored in the memory 310, wherein the UE is configured to report CSI to a base station and wherein a first frequency resource(s) to be measured for the CSI is indicated as UL on a symbol in a slot in a reference resource for the CSI. The CPU 308 could execute program code 312 to enable the UE (i) to skip the report or reports a predefined value for the CSI, or (ii) to measure reference signal within a second frequency resource(s) on the symbol in the slot and report CSI for the second frequency resource(s). Furthermore, the CPU 308 can execute the program code 312 to perform all of the above-described actions and steps or others described herein.

Figure 19:
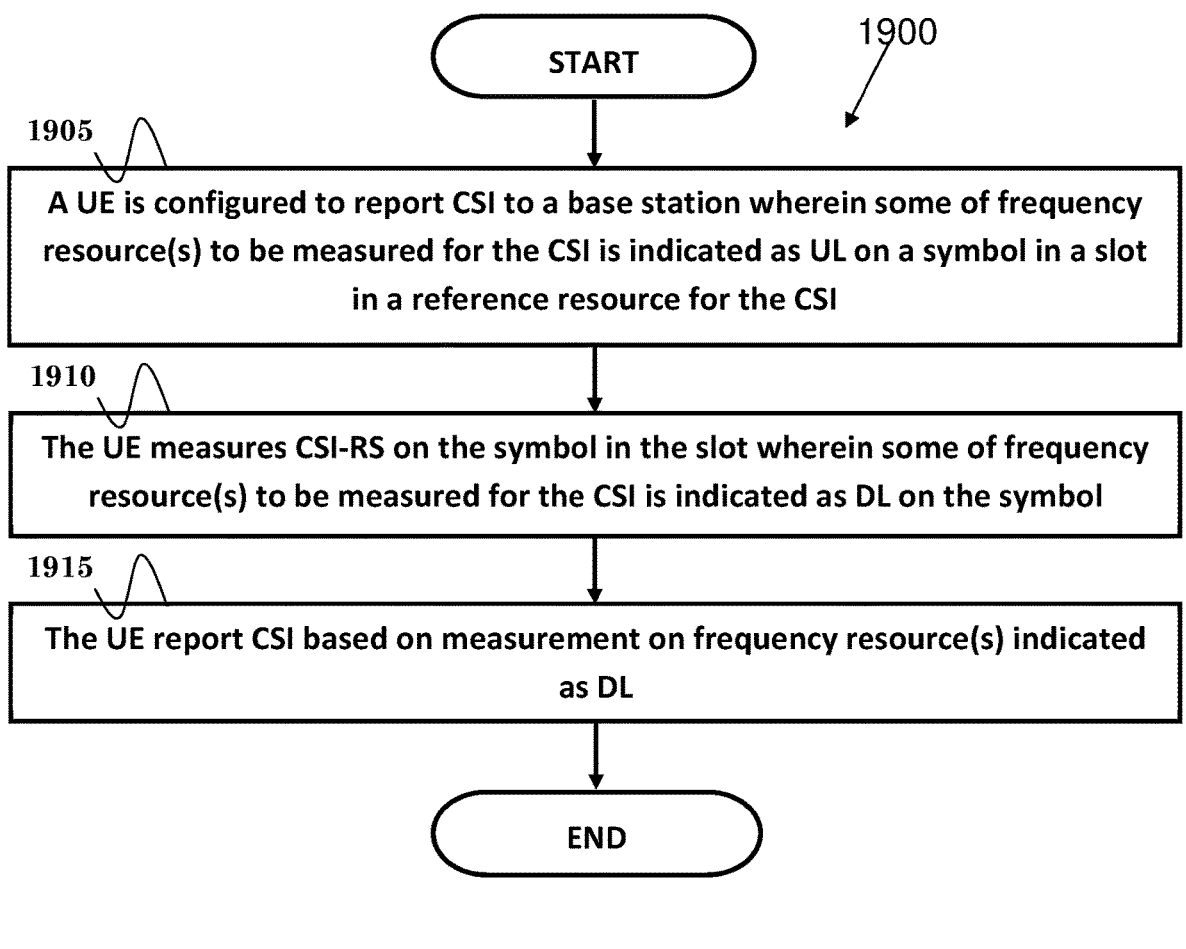
FIG. 19 is a flow chart according to one exemplary embodiment.

FIG. 19 is a flow chart 1900 of a method for channel state information reference resource. In step 1905, a UE is configured to report CSI to a base station wherein some of frequency resource(s) to be measured for the CSI is indicated as UL on a symbol in a slot in a reference resource for the CSI. In step 1910, the UE measures CSI-RS on the symbol in the slot wherein some of frequency resource(s) to be measured for the CSI is indicated as DL on the symbol. In step 1915, the UE report CSI based on measurement on frequency resource(s) indicated as DL.

In one embodiment, the frequency resource(s) to be measured for the CSI may be all frequency resource(s) to be measured in the slot. The frequency resource(s) to be measured for the CSI may be part of frequency resource(s) to be measured in the slot. A number of PRBs within frequency resource(s) to be measured for the CSI indicated as DL may be more than a threshold. A proportion of frequency resource(s) to be measured for the CSI indicated as DL may be more than a threshold.

Referring back to FIGS. 3 and 4, in one exemplary embodiment of a method for a UE, the UE 300 includes a program code 312 stored in the memory 310, wherein the UE is configured to report CSI to a base station and wherein some of the frequency resource(s) to be measured for the CSI is indicated as UL on a symbol in a slot in a reference resource for the CSI. The CPU 308 could execute program code 312 to enable the UE (i) to measure CSI-RS on the symbol in the slot wherein some of frequency resource(s) to be measured for the CSI is indicated as DL on the symbol, and (ii) to report CSI based on measurement on frequency resource(s) indicated as DL. Furthermore, the CPU 308 can execute the program code 312 to perform all of the above-described actions and steps or others described herein.

Figure 20:
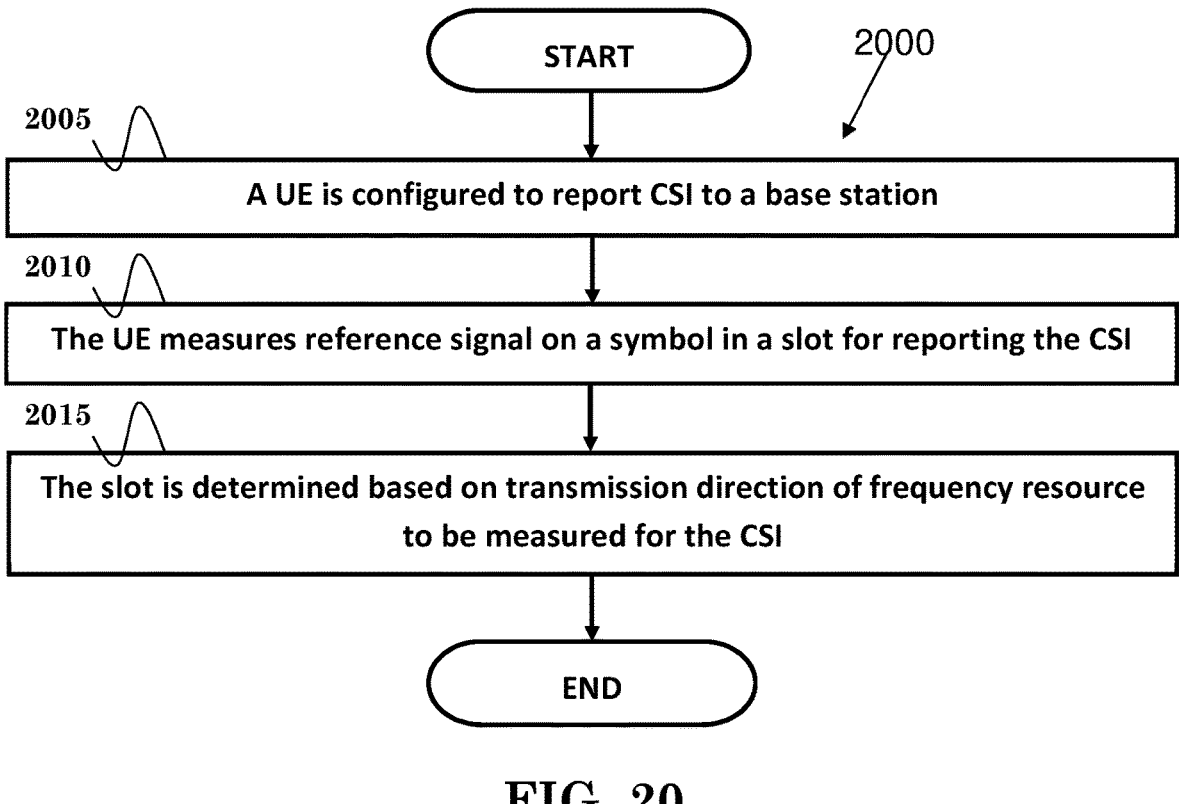
FIG. 20 is a flow chart according to one exemplary embodiment.

FIG. 20 is a flow chart 2000 of a method for channel state information reference resource. In step 2005, a UE is configured to report CSI to a base station. In step 2010, the UE measures reference signal on a symbol in a slot for reporting the CSI. In step 2015, the slot is determined based on transmission direction of frequency resource to be measured for the CSI.

In one embodiment, the slot may be a slot that transmission direction of all frequency resource to be measured for the CSI in the slot is DL on the symbol. The slot may be a slot that transmission direction of at least part of frequency resource to be measured for the CSI in the slot is DL on the symbol. The frequency resource to be measured for the CSI may be wideband. A wideband may be measured for the CSI.

The frequency resource to be measured for the CSI may be a CSI subband. A CSI subband is measured for the CSI. In one embodiment, the CSI is a wideband CSI. In one embodiment, the CSI is a subband CSI.

Referring back to FIGS. 3 and 4, in one exemplary embodiment of a method for a UE, the UE 300 includes a program code 312 stored in the memory 310, wherein the UE is configured to report CSI to a base station. The CPU 308 could execute program code 312 to enable the UE (i) to measure reference signal on a symbol in a slot for reporting the CSI, and (ii) to determine the slot based on transmission direction of frequency resource to be measured for the CSI. Furthermore, the CPU 308 can execute the program code 312 to perform all of the above-described actions and steps or others described herein.

Various aspects of the disclosure have been described above. It should be apparent that the teachings herein could be embodied in a wide variety of forms and that any specific structure, function, or both being disclosed herein is merely representative. Based on the teachings herein one skilled in the art should appreciate that an aspect disclosed herein could be implemented independently of any other aspects and that two or more of these aspects could be combined in various ways. For example, an apparatus could be implemented or a method could be practiced using any number of the aspects set forth herein. In addition, such an apparatus could be implemented or such a method could be practiced using other structure, functionality, or structure and functionality in addition to or other than one or more of the aspects set forth herein. As an example of some of the above concepts, in some aspects concurrent channels could be established based on pulse repetition frequencies. In some aspects concurrent channels could be established based on pulse position or offsets. In some aspects concurrent channels could be established based on time hopping sequences. In some aspects concurrent channels could be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method, comprising:
determining, by a User Equipment (UE), a slot based on a transmission direction of a frequency resource to be measured for a Channel State Information (CSI);

measuring, by the UE, a reference signal on a symbol in the determined slot for reporting the CSI; and reporting, by the UE, the CSI to a base station based on the measured reference signal.

2. The method of claim 1, wherein the slot is a slot that transmission direction of all frequency resource to be measured for the CSI in the slot is Downlink (DL) on the symbol.

3. The method of claim 1, wherein the slot is a slot that transmission direction of at least part of the frequency resource to be measured for the CSI in the slot is Downlink (DL) on the symbol.

4. The method of claim 1, wherein the frequency resource to be measured for the CSI is wideband.

5. The method of claim 1, wherein the frequency resource to be measured for the CSI is a CSI subband.

6. A method, comprising:
determining, by a User Equipment (UE), that a first frequency resource to be measured for Channel State Information (CSI) is indicated as Uplink (UL) on a symbol in a slot in a reference resource for the CSI; and in response to determining that the first frequency resource is indicated as UL on the symbol in the slot, at least one of:
skipping, by the UE, reporting the CSI;
reporting, by the UE, a predefined value for the CSI; or
measuring, by the UE, a reference signal within a second frequency resource on the symbol in the slot and reporting, by the UE, CSI for the second frequency resource.

7. The method of 6, wherein frequency resources to be measured for the CSI is all frequency resource(s) to be measured in the slot.

8. The method of claim 6, wherein the first frequency resource to be measured for the CSI is part of frequency resources to be measured in the slot.

9. The method of claim 8, wherein the first frequency resource to be measured for the CSI is wideband.

10. The method of claim 7, wherein the first frequency resource to be measured for the CSI is a CSI subband.

11. A method, comprising:
determining, by a User Equipment (UE), that a first frequency resource to be measured for Channel State Information (CSI) is indicated as Uplink (UL) on a symbol in a slot in a reference resource for the CSI;

measuring, by the UE, Channel State Information Reference Signal (CSI-RS) on the symbol in the slot, wherein a second frequency resource to be measured for the CSI is indicated as Downlink (DL) on the symbol; and reporting, by the UE, CSI based on a measurement on the second frequency resource indicated as DL.

12. The method of claim 11, wherein frequency resource(s) to be measured for the CSI is all frequency resource(s) to be measured in the slot.

13. The method of claim 11, wherein frequency resource(s) to be measured for the CSI is part of frequency resource(s) to be measured in the slot.

14. The method of claim 11, wherein a number of Physical Resource Blocks (PRBs) within frequency resource(s) to be measured for the CSI indicated as DL is more than a threshold.

15. The method of claim 11, wherein a proportion of frequency resource(s) to be measured for the CSI indicated as DL is more than a threshold.

16. The method of claim 11, wherein the first frequency resource to be measured for the CSI is wideband.

17. The method of claim 11, wherein the first frequency resource to be measured for the CSI is a CSI subband.

18. The method of claim 11, wherein the second frequency resource to be measured for the CSI is wideband.

19. The method of claim 11, wherein the second frequency resource to be measured for the CSI is a CSI subband.

20. The method of claim 5, wherein a subband report is generated based on a measurement on the CSI subband.

* * * * *